United States Patent [19]

Johnson et al.

[11] Patent Number: 5,732,404
[45] Date of Patent: Mar. 24, 1998

[54] FLEXIBLE EXPANSION OF VIRTUAL MEMORY ADDRESSING

[75] Inventors: David Randal Johnson, Oakdale; Wayne Douglas Ward, New Brighton, both of Minn.

[73] Assignee: Unisys Corporation, Blue Bell, Pa.

[21] Appl. No.: 625,461

[22] Filed: Mar. 29, 1996

[51] Int. Cl.⁶ .......................... G06F 12/04; G06F 12/10
[52] U.S. Cl. .................... 711/2; 711/3; 711/202; 711/5; 711/6; 711/200; 711/203
[58] Field of Search ..................... 395/402, 416, 395/418, 415, 419, 406, 408, 413, 412, 421.1, 421.07; 711/202, 203, 2–6, 9, 200

[56] References Cited

U.S. PATENT DOCUMENTS

| | | | |
|---|---|---|---|
| 3,614,746 | 10/1971 | Klinkhamer | 711/206 |
| 4,355,355 | 10/1982 | Butwell et al. | 395/418 |
| 5,095,420 | 3/1992 | Eilert et al. | 395/419 |
| 5,129,070 | 7/1992 | Dorotte | 711/209 |
| 5,317,706 | 5/1994 | Pechter | 395/402 |
| 5,369,750 | 11/1994 | Inoue et al. | 395/406 |
| 5,371,867 | 12/1994 | George et al. | 395/406 |
| 5,379,392 | 1/1995 | Alferness et al. | 395/405 |
| 5,381,537 | 1/1995 | Baum et al. | 395/410 |
| 5,414,821 | 5/1995 | Nguyen et al. | 395/413 |
| 5,420,992 | 5/1995 | Killian et al. | 395/800 |
| 5,426,748 | 6/1995 | Brenza et al. | 395/413 |
| 5,426,752 | 6/1995 | Takahasi et al. | 395/419 |
| 5,450,587 | 9/1995 | Salm | 395/402 |
| 5,479,627 | 12/1995 | Khalidi et al. | 395/415 |
| 5,479,628 | 12/1995 | Olson et al. | 395/416 |
| 5,479,631 | 12/1995 | Manners et al. | 395/465 |

FOREIGN PATENT DOCUMENTS

| | | | |
|---|---|---|---|
| 208429 | 1/1987 | European Pat. Off. | G06F 12/02 |
| 421845 | 4/1991 | European Pat. Off. | G06F 12/02 |

*Primary Examiner*—Eddie P. Chan
*Assistant Examiner*—Than V. Nguyen
*Attorney, Agent, or Firm*—Charles A. Johnson; Mark T. Starr

[57] ABSTRACT

A multiple-word virtual address flexibly expands the virtual address space of a computer system without requiring the modification of the word size of the computer system. In a memory system having a virtual memory mapped to an absolute memory, the virtual memory is divided up into multiple levels each having a plurality of memory banks. Each memory bank has a plurality of words. The multiple-word virtual address provides a plurality of words for specifying the virtual memory level, memory bank, and offset word within the memory bank, to describe a selected memory location. Special instructions are added to the instruction set architecture to set up a window of program visibility, called a peephole, into a selected area of the expanded virtual memory. Existing programs are compatible with the multiple-word addressing scheme, and can also reference virtual memory through a defined peephole. New programs using multiple-word virtual addresses can still call procedures requiring single word virtual addresses.

16 Claims, 9 Drawing Sheets

FLEXIBLE EXPANSION OF VIRTUAL MEMORY ADDRESSING

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to storage address formation and control in a computer system. The invention is more specifically related to expanding the virtual addresses available for use in a computer architecture from a single word to a variable number of words thereby providing existing programs the capability to access the expanded virtual addresses, but requiring newly written programs to select the expanded virtual addresses. Thus, an existing program can access data of a newly written program when an expanded virtual address is passed to the existing program.

2. Background Information

The term "virtual memory" (or virtual storage) denotes the simulation of a uniformly addressable computational memory large enough to accommodate all instantiations of a program on all configurations of a computer system. Virtual memory originated as a way to simplify application programming in machines with memory hierarchies. With virtual memory, application programmers no longer had to include commands to move blocks of information among the levels of the memory hierarchy as the operating system manages the application's virtual memory.

Virtual memory is also being incorporated into parallel processing computer systems that may consist of hundreds or even thousands of computers (each with a processor and local RAM), hooked together by an interconnection network. The virtual addressing concept is being extended to map a single, common virtual address space across distributed systems. Its uniform addressing scheme allows any processor to refer to any data element in any of the component computers' memories. The memory access algorithm scales across many sizes of computer systems. Thus, virtual memory also hides distributed memory.

The key to virtual memory is a uniform address format and addressing protocol that is independent of the sizes of memory levels and the number of computing elements. Virtual address space is the programmer's view of memory. Typically, the virtual address space contains $2A$ words (or bytes) on a machine whose processors use A-bit virtual addresses. The entire set of addresses supported by the 2200 computer system commercially available from Unisys Corporation is called the "absolute address space" of the system. The absolute address space is often much larger than the virtual address space. The absolute address space holds all programs and data which are spread across the various virtual address spaces visible to different programs or threads of control. The set of addresses recognized by the hardware is called the "real address space" of the machine. The real address space is bound by the physical constraints of the memory size. The real address space contains $2B$ words on a machine with B-bit addresses. While some computer architectures utilize a three-level memory hierarchy of virtual, absolute, and real addresses as discussed above, most utilize a two-level memory hierarchy of virtual and linear addresses.

The virtual address space does not have to be the same size as the real address space. If it is smaller, RAM can hold several address spaces and the virtual memory system implements multiprogramming. If it is larger, the virtual memory system will automatically move information into RAM as needed, to simulate the appearance that the whole address space available to a program is in RAM. Even if it is larger, the same RAM can be partitioned among several address spaces, again implementing multiprogramming.

The mapping from processor-generated addresses to memory-recognizable addresses is carried out by a dynamic address translator. When the program generates a read access request, the processor address translator presents a read request to the memory system, and passes back the value read to the processor and thus to the program. Similarly, when the program generates a write access request, the processor address translator presents the write to the memory system. This design makes address translation transparent to the computer programmer. The program view of addressing invariance with respect to changes in the machine's configuration or the distribution of data among memory elements in the memory hierarchy is achieved by allowing the operating system to change the mapping tables during a program's execution, thereby reflecting the system state dynamically during the mapping operation, rather than in the program itself.

The size of the virtual address is currently bound by the number of bits representing an address. A virtual address is stored in a single word by a computer system and manipulated as a single word by instructions being executed by the processors. Hence, the upper limit on the size of the virtual address space has always been bound by the word size of the machine. As the basic word size of the majority of computer systems has increased from 8 bits to 16 bits, then to 32 bits, and most recently, to 64 bits, the size of virtual address space has increased accordingly, from $28$ words to $216$ words, then to $232$ words, and perhaps to $264$ words. A severely negative impact to this progression is the fact that each change in the word size necessitates a major change in the hardware design of the instruction processors, data paths, register sizes, instruction sets, and the like. This redesign effort is costly, but perhaps more important from a user's perspective is that each new generation of machines invalidates the existing base of installed programs running on the old generation of machines. That is, in most cases, the new architectures are not fully backward compatible. As the databases used by some programs grow larger, possibly causing the upper limit of virtual address space to be exceeded, programs must be re-written to handle this memory violation. Maintenance of these programs and porting existing programs to the next generation of machines (having a larger virtual address space) is an expensive and time-consuming activity. What is needed in the computer architecture art is an addressing scheme whereby the virtual address space is independent of the particular word size of a machine and may be enlarged under system control without requiring a major change in the hardware. The virtual address translation must still be transparent to the programmer, and backward compatibility must be maintained. Such a method and apparatus would be a valuable advance in the computing arts because as more virtual address space is needed, software parameters could be manipulated to provide the added capability without having a negative impact on existing programs, instruction sets, and fundamental hardware architectures. The present invention as described below fulfills these objectives and provides an architectural framework upon which flexible expansion of the virtual address space may occur.

SUMMARY OF THE INVENTION

An object of this invention is to flexibly expand the size of the virtual address space of a computer system without changing the word size of the system's architecture.

Another object of this invention is to flexibly expand the size of the virtual address space of a computer system while maintaining backward compatibility such that existing programs continue to execute correctly with the new system, and existing programs can now access data within windows of newly expanded addressing as long as the total window addressing space does not exceed the total visibility of the existing addressing space.

Yet another object of this invention is to flexibly increase the size of the virtual address while maintaining compatibility between previously coded programs and new programs using the larger virtual address.

A further object of this invention is to flexibly increase the size of the virtual address so that previously coded programs can transparently access data described by a virtual address that is larger than the program is aware of or can handle.

Another object of this invention is to provide an extensible virtual address expansion scheme which does not require re-compiling or re-coding of existing programs yet enlarges the available virtual address space in a generalized way for new programs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended Claims.

According to the present invention, the foregoing and other objects and advantages are attained by a novel method and apparatus for flexibly expanding the size of the virtual memory addressable by a program being executed by the computer system without requiring expansion of the word size. The preferred embodiment of the present invention defines a multiple-word virtual address having up to 18,360 bits. Applications of the present invention to other computer architectures based on different word sizes would result in smaller or larger maximum sizes of the multiple-word virtual address. This multiple-word virtual address includes components for specifying a virtual memory level, a memory bank within a selected virtual memory level, and an offset word within a selected memory bank. The method includes the step of interpreting a standard single-word virtual address in an addressing instruction being executed by the computer system as specifying the sizes in words of the addressing fields that immediately follow in a multiple-word virtual address data structure including fields specifying the selected virtual memory level, selected memory bank, and selected offset word. The data structure has variable size. That is, one or more words are included to specify the virtual memory level, one or more words are included to specify the memory bank, and one or more words are included to specify the offset word. Other fields in the multiple-word virtual address define the number of virtual memory level words, the number of memory bank words, and the number of offset words in the structure. The method also includes the step of accessing a location in absolute memory, and therefore real memory, addressed by the multiple words of virtual memory level, memory bank, and offset indicators.

The multiple-word virtual address scheme provides for the extension of the virtual address space in variable sized increments, rather than by merely doubling the existing word size. The number of virtual memory levels supported in the computer system, the number of memory banks within a virtual memory level, and the number of words within a memory bank may all be redefined for a given instantiation of a computer architecture as needed. Each of these variables may be modified independently of each other. This flexible addressing arrangement eliminates the need for the complete redesign of an architecture (including changes to word sizes, register sizes, data paths, instruction processors, etc.) in order to expand the virtual address space beyond the limitations of the single word virtual address.

Existing programs continue to execute correctly, and they can even reference newly available virtual memory that is passed to them. Special instructions are added to the instruction repertoire of the computer system of the present invention to allow new programs written to use multiple-word virtual addresses to call existing procedures requiring single word virtual addresses. A window of program visibility into virtual memory called a peephole is used by programs to access memory locations in the expanded virtual memory space. Peepholes can be created to allow program access to the vastly increased virtual memory space.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended Claims.

DESCRIPTION OF THE PREFERRED EMBODIMENT

The preferred embodiment of the present invention provides an expanded virtual address capability. The virtual address ha prior computer systems comprised one word. In many computer systems, a word contains 32 bits. In 2200 Series computer systems commercially available from Unisys Corporation, the word size is 36 bits. The present invention permits the virtual address to range between 3 and 510 words. Previously coded programs can transparently be passed address spaces in the larger virtual address space. Although the preferred embodiment of the present invention describes the expression of a 1-word virtual address to a larger virtual address, this invention also provides for the expansion of the virtual address independent of the initial size of the address or of the size of words in the computer architecture.

The Real Address Space and the Absolute Address Space provided by a 2200 Series computer system are visible only to the Operating System. These addresses can be changed transparently to all other programs executing on the system. The Relative Address is the structure of an instruction's reference of data or another instruction relative to the Base Register selected for reference in the instruction. The Relative Address consists of index register selection, index register size, and address/constant field size within the instruction. Although a Relative Address could be expanded, the present invention expands the Virtual Address without changing the Relative Address.

Figure 1:
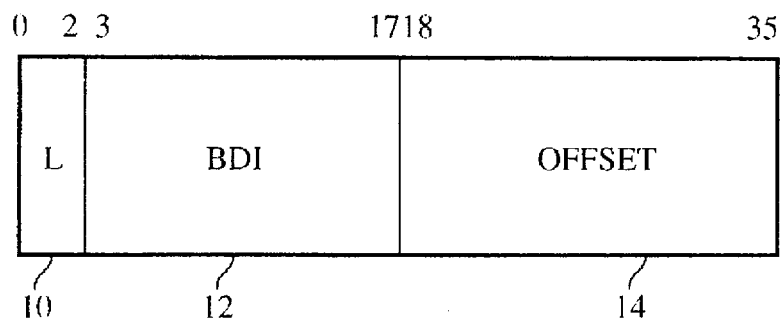
FIG. 1 is a prior art diagram showing a 1-word Virtual Address.

The Virtual Address is the programmers' view of space. FIG. 1 is a prior art diagram showing a 1-word Virtual Address. This Virtual Address is in use on the 2200 Series computer system, but also is an illustrative example of typical virtual addresses in use by a variety of computer architectures. The Virtual Address is made up of three components. The Level (L) field 10, indicates a level of the address tree in the memory hierarchy and also specifies the Bank Descriptor Table for the address tree level. Three bits of the virtual address are allocated to the level, so there may be up to eight levels (and correspondingly, up to eight Bank Descriptor Tables). The Bank Descriptor Table is a data structure used by the Operating System to map Bank Descriptors to Banks. A Bank is a block of memory in the storage system having a variable size up to a maximum number of words. A Bank Descriptor is a pointer to a particular Bank. The Bank Descriptor Index (BDI) field 12, specifies the Bank Descriptor (BD) within the Bank Descriptor Table. The BDI field contains 15 bits. The Offset field 14 specifies a word within the Bank pointed to by the selected Bank Descriptor. The Offset field contains 18 bits.

Figure 2:
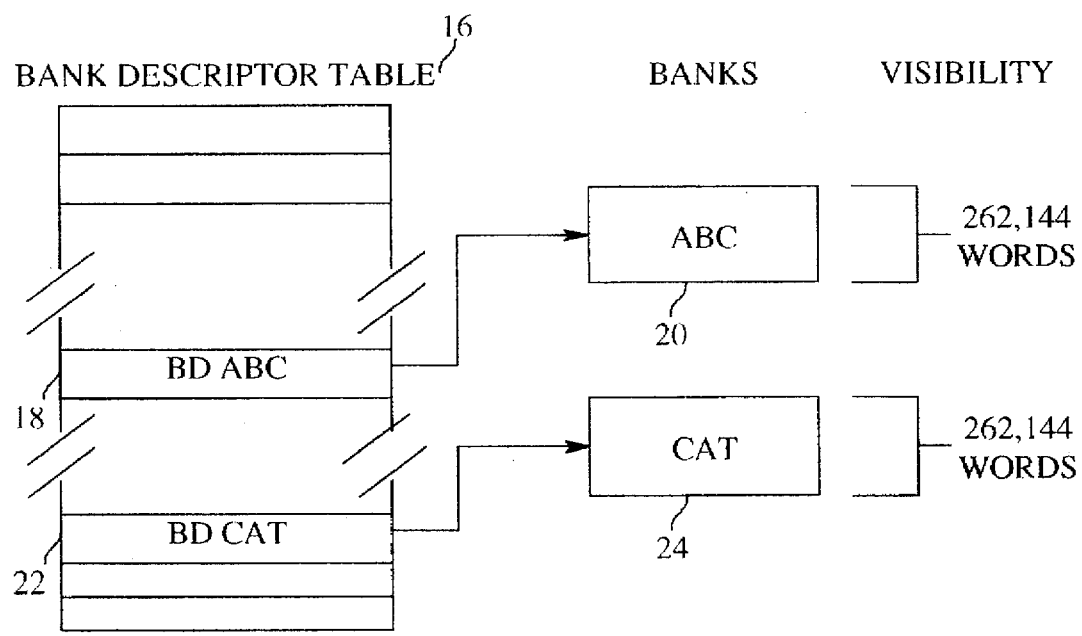
FIG. 2 is a prior art diagram showing an example of independent Small Banks.
Figure 3:
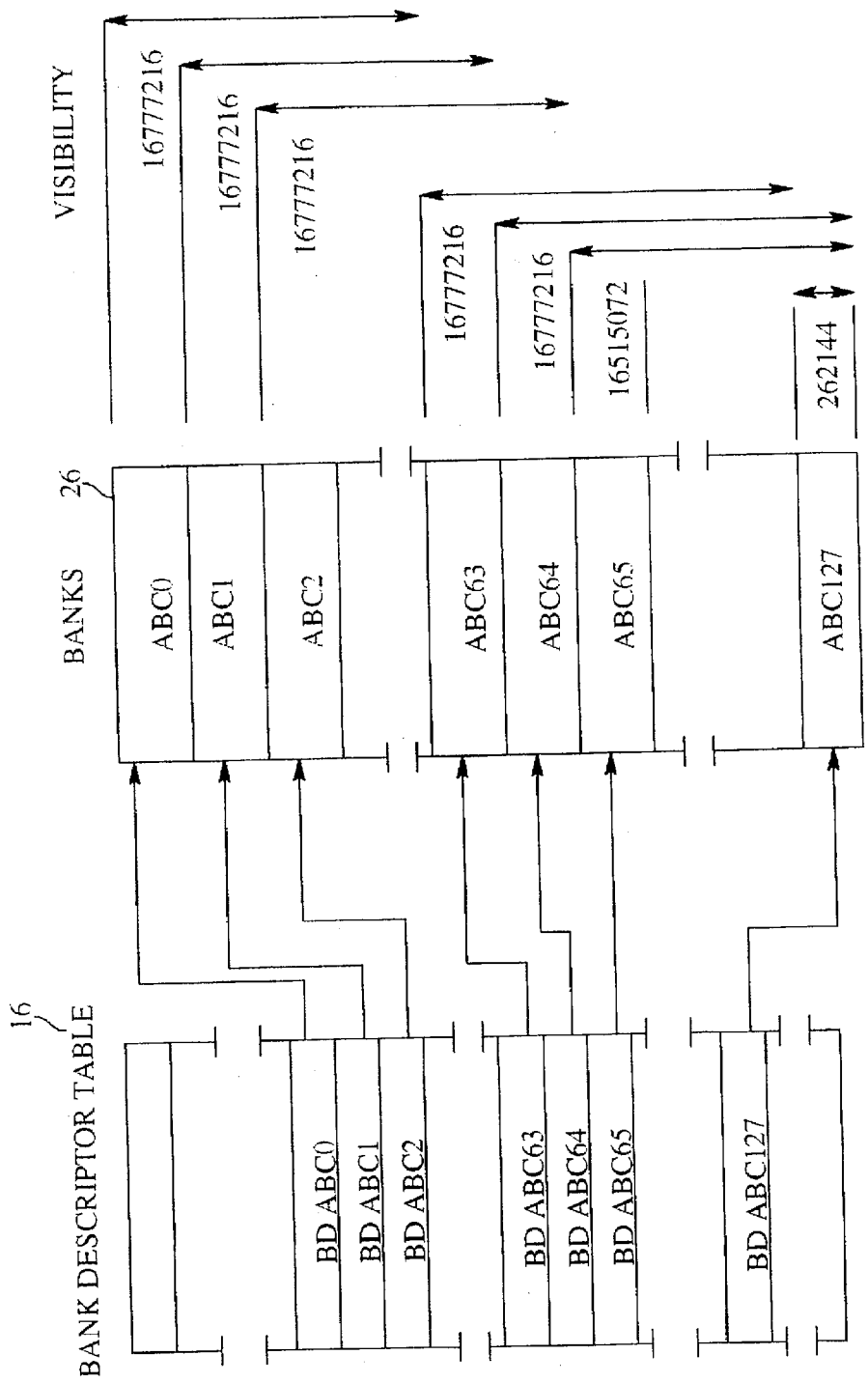
FIG. 3 is a prior art diagram showing an example of Very Large Banks.

The Operating System creates three types of Banks: Small Banks, Large Banks, and Very Large Banks. Small Banks contain up to $2^{}18$ words and use one Bank Descriptor. FIG. 2 is a prior art diagram showing an example of independent Small Banks. The Bank Descriptor Table 16 has up to $2^{}15$ entries indexed by a Bank Descriptor Index (BDI). For example, entry BD ABC 18 contains a Bank Descriptor (BD) which points to Bank ABC 20. The program accessing this Bank has visibility up to all 262,144 words of the referenced Bank. Similarly, entry BD CAT 22 contains a BD which points to Bank CAT 24. The program accessing Bank CAT also has visibility up to all 262,144 words in the Bank. The 2200 Series computer system also allows for the creation of Very Large Banks which describe up to $2^{}33$ words. An address in a Bank built this way cannot be passed as a Virtual Address for a parameter. This type of bank is not built by the Operating System. Maximum visibility to a based bank (or portion of a bank when subsetted) remains at $2^{}24$ words. While the entire bank of $2^{}33$ words is not visible to a user, Very Large Banks are still useful because of subsetting. Subsetting allows a user to load a Bank at a particular Virtual Address within the bank and have visibility to word $2^{}24$ from the subsetted "starting point" or the end of the bank, whichever is less. FIG. 3 is a prior art diagram showing an example of Very Large Banks. As in FIG. 2, the Bank Descriptor Table 16 holds pointers to actual Banks of memory. Because a Very Large Bank can have an upper limit up to $2^{}33-1$, a control bit called the "U-bit" is stored in the BD. This bit specifies that when subsetting the BD, the upper limit is not decreased to account for the subset, keeping maximum visibility to the Bank. The U-bit is set for those BDs which describe other than the last $2^{}24$ words of the Very Large Bank.

Although FIG. 3 shows that the visibility from the beginning of ABC0 26 is 16777216, the visibility is 16777216 from any subset address within BD ABC0. This works for BDs ABC0–ABC63 since permitting 16777216 visibility from any subset address with the BD does not permit visibility beyond the end of the logical bank. BD ABC64–ABC127 do not have the U-bit set to prevent access from exceeding the end of the logical bank. Very Large Banks limit one logical bank to being no larger than one Level of the address tree.

Banks have protection attributes to support sharing and separation of both code and data through access rights. Each Bank Descriptor has Special Access Permissions (SAP), General Access Permissions (GAP), and an Access Lock to enforce protection and to support sharing.

The 1-word Virtual Address (VA) is used for passing parameters in current Operating System software for the 2200 Series computer system available from Unisys Corporation. For example, consider a table of four entries (0–3) with three 36-bit words per entry. Consider the table beginning at word 116 in the bank specified by Level 6, BD 14. Program A intends to call program B and have program B work on entry 2. Program A determines the VA of entry 2 to be L=6, BDI=14, Offset=124 (VA=600014000124 octal) and passes the VA to Program B. Program B executes a Load Base Register, User (LBU) instruction to load the VA, say to Base Register 5. After the load, the relative address 0–2 from Base Register 5 is entry 2 of the table. Program B requires no indexing to access the entry's data. Program B acquires its passed parameters in this fashion no matter what program is invoking it and no matter where the parameters actually existed relative to the invoking program.

Any new addressing scheme must be compatible with the parameter passing scheme already in existence to ensure backward compatibility. Just because some program may require more BDs or require individual BDs that describe more space, all programs need not change. If a program requires a larger, logical bank because it has more customer records (for instance), all of the associated programs that perform one function on one customer record should not have to be re-written or re-compiled when their function has not changed. Further changing the programs may require two copies of each program: one for the 1-word VA scheme and one for the newer scheme. With traditional virtual address expansion, all associated programs need to be re-coded to use the expanded virtual address space. The present invention avoids the need for re-coding.

The new virtual addressing scheme of the present invention supports many more, even larger Banks. Programs are able to grow independently in both the Bank size dimension and the number of Banks dimension. The present invention allows a new program that is aware of larger Virtual Addresses (VAs) to pass a 1-word Virtual Address to an existing program. Without being re-compiled, an existing program is able to subset to any passed 1-word virtual address and access the appropriate data created or defined by large addressing. Existing programs use the Load Base Register, User (LBU) instruction as defined by the current 2200 Series computer architecture. The existing program need not know of a larger space or more spaces if its function and required visibility are unchanged. With the present invention, the number of words per Bank Descriptor (BD) changes, but the format of BDs are known only to the Operating System and hardware, not to user programs.

The present invention provides many advantages over previous single word-based Virtual Addresses. It provides for larger Banks than were previously possible by permitting a single Bank Descriptor to describe much more than 262K words. It permits more levels of the address tree to be defined. It permits more Banks to be defined in a Bank Descriptor Table (in one address tree level). It accomplishes these advantages primarily by providing a multiple-word Virtual Address. With leading zeros in the fields, a multiple-word VA can identify any previously existing Bank defined by a 1-word VA, as well as larger Banks and/or Banks with a larger Bank Descriptor Index (BDI) and/or Banks contained in larger numbered Levels. Another novel feature of this invention is the capability for a "peephole." The peephole can provide visibility to normal, previously existing Banks as well as to larger Banks and more Banks than previously supported (e.g. to Banks not directly visible through a 1-word VA). Peepholes are (a series of) Peephole BDs accessible as 1-word VAs. A peephole may be thought of as a window of program visibility into a Bank of memory. The window of visibility has a size that is equal to or less than the unexpanded addressing visibility based on the word size of the virtual address. The peephole itself is a BD within the Virtual Addresses of Bank Descriptor Tables that are visible by normal single-word Virtual Addresses. The VA of a peephole is passed as a 1-word VA to existing or future programs. Peepholes BDs and their target BDs need not exist at the same Level. Non-privileged programs (that are aware of the expanded addressing) are allowed to establish the visibility through a peephole to a Bank or part of a Bank in the expanded address area. The present invention also provides a method of moving (via a destructive copy) a BD from an L (Level) and BDI (Bank Descriptor Index) that is visible to a 1-word VA to a BDI that is not visible to a 1-word VA and vice versa. Those BDs with L.BDIs that are visible to a 1-word VA can be accessed in the normal manner. Moving a BD allows a program that is aware of addresses larger than 1-word to control which BDs are visible as 1-word VAs. Queuing architecture is enhanced by providing larger addressing for both number and size of Banks (Queue Banks).

The preferred embodiment of the present invention provides an incrementally expandable, variable length, multiple-word Virtual Address. Further, each dimension of the Virtual Address (Level, BDI, Offset) can be expanded independently. The scheme is compatible with 2200 Series computer architecture Virtual Addresses because the 2200 Operating System does not use Level 7 of the address tree. It is also equally applicable to any other computer architecture. The penalty for adding one extra word to indicate the sizes of each of the fields is very small considering that a Base Register needs to be loaded even before the data can be referenced. Further, multiple words must be accessed (at least two are required, at miniature, to expand the VA). For instructions, general register Aa can contain only a 1-word VA, but multi-word storage parameters can contain either a 1-word VA or a multi-word VA. Multiple-word VAs in registers are discouraged because of the overhead of managing blocks of adjacent registers to hold a VA and because a multi-word VA can potentially expand to use more general purpose A-registers than exist.

Figure 4:
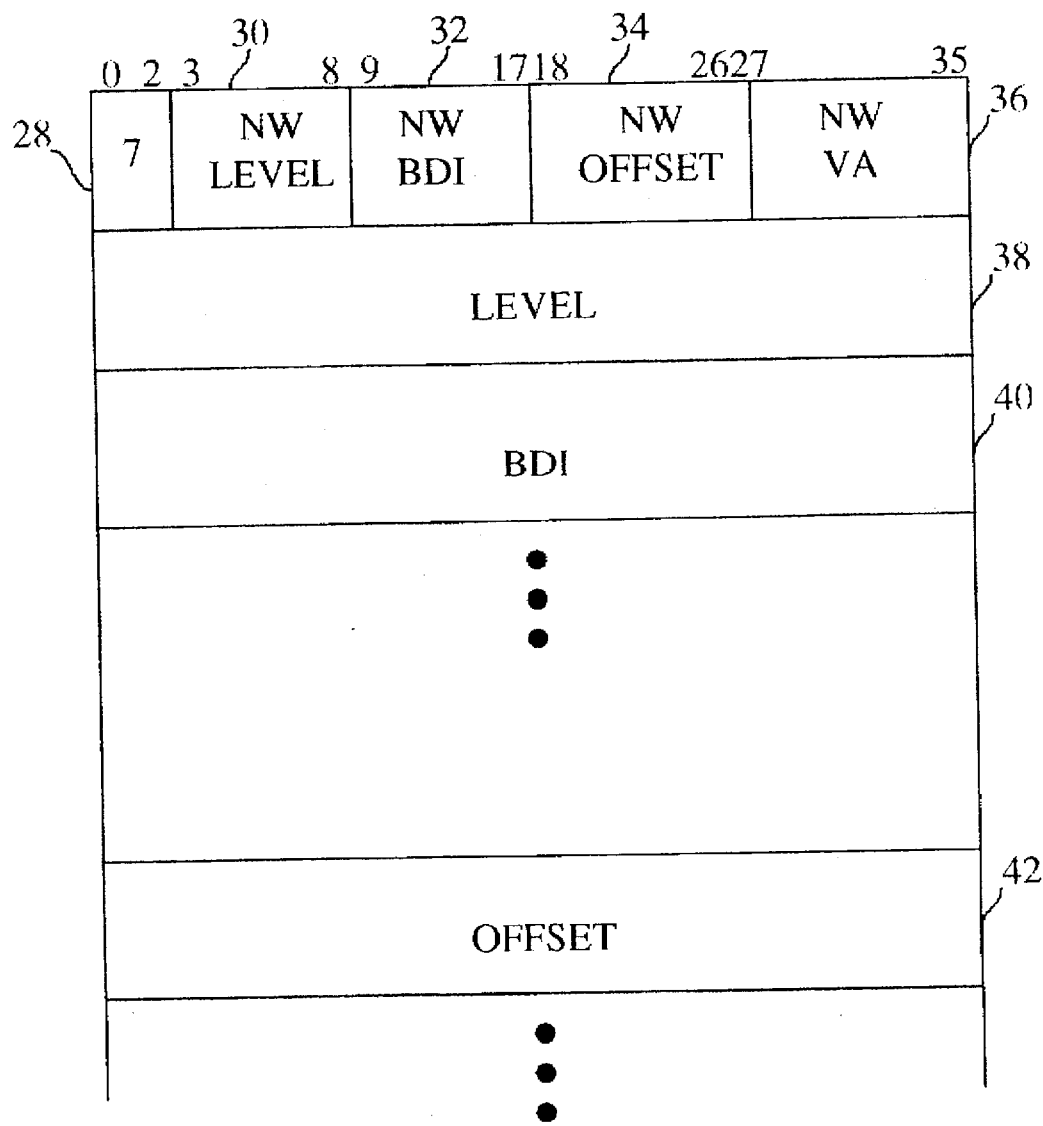
FIG. 4 is a diagram of the incrementally expandable, multiple-word Virtual Address of the present invention.

FIG. 4 is a diagram of the incrementally expandable, multiple-word Virtual Address of the present invention. Multiple Word Indicator field 28 indicates that this is a multiple-word Virtual Address (VA). Level 7 of the memory hierarchy has not been previously used in 1-word VAs. If bits 0–2 are not 7, then this is a 1-word VA. The Number of Words of Level (NW LEVEL) field 30 specifies the number of words of Level contained in this VA. In the preferred embodiment, this field contains six bits, thus the range is 1 to 63 words of Level. The Number of Words of BDI field (NW BDI) 32 specifies the number of words of BDI contained in this VA. In the preferred embodiment, this field contains 9 bits and the valid range is 1 through 508 words of BDI. The Number of Words of Offset field (NW OFFSET) 34 specifies the number of words of Offset contained in this VA. In the preferred embodiment, this field contains 9 bits and the valid range is 1 to 508 words of Offset. For VAs with a required Offset of zero, specifying zero words for Offset satisfies that requirement. The Number of Words of Multiple-Word VA field (NW VA) 36 specifies the number of words in this multiple-word Virtual Address. In the preferred embodiment, this field contains 9 bits, and the range is 3 to 511 words of VA. A program can use the number of words of the multiple-word VA to add to the index register used to select multiple-word VAs to locate the next multiple-word VA of a sequence of multiple-word VAs to load. The value could be required to be some multiple of n words or some power of two. The value could be allowed to be different for different multi-word VAs. This value must be greater than or equal to 1+Number of Words of Level+Number of Words of BDI+Number of Words of Offset. The Level field 38 indicates Level of the address tree and also specifies the Bank Descriptor Table for the address tree Level. Note that when "7" is specified in this field, that number is used to select a Bank Descriptor Table (not to interpret another multi-word Virtual Address). The Level may contain from 1 to 508 words. The BDI field 40 is the Bank Descriptor Index. The BDI may contain from 1 to 508 words. It specifies the Bank Descriptor within the Bank Descriptor Table. The Offset field 42 specifies a word within the selected Bank Descriptor. The Offset may contain from 1 to 508 words. In the preferred embodiment, constraints on the sizes of the L, BDI, and Offset fields are limited by the specific architecture, by particular hardware model implementations, and by the Operating System. The Operating System's limits are enforced by the architecture (just as the Upper Limit of the Bank Descriptor Table (BDT) currently limits the number of BDIs in a BDT and Upper Limit of the BD limits the Offset within the BD).

The present invention increases the size of a Bank that can be described by one Bank Descriptor (BD) and increases the number of BDs per Bank Descriptor Table (BDT). Past systems had 215 Banks addressable, each with 218 words per Level. Thus, 233 words were addressable as one logical Bank in the system. The present invention overcomes this limitation by allowing a program to access more words per Bank, more Banks, and more Levels of Banks. BDs in a Level (0–6) BDT with a Bank Descriptor Index (BDI) less than 215 are accessed normally by 1-word VA. BDs with BDI greater than 215 can be accessed via the peephole function and via the move BD function. The access data via a peephole, a program executes an LBU instruction to load the peephole. Any Bank except an Indirect or Peephole Bank can have a peephole to it: (1) the target Bank may have a BDI greater than 215, (2) the target Bank may have a BDI less than 2**15, (3) the target Bank may exist at any Level, including the same Level as the peephole, and (4) the target Bank may be any Size.

Larger Banks (one individual BD) may hold data larger than 233 words. These Banks have an implied Lower Limit equal to 0 and a word-granular Upper Limit. A BD for this capability Bank is identified by having the BD Size field equal to 2. A Size equal to 2 can also be used to describe any Bank with a Lower Limit equal to 0 that was previously described by a Size equal to 0 or by a Size equal to 1. Larger Banks are not restricted to exist above 215 in the BDT. When directly loadable (L less than 7, BDI less than 215), only 262K of memory is visible to prevent an addressing anomaly in indexing a Bank versus stepping a 1-word VA. To access more than 262K of a larger Bank, a peephole is used. Any direct access to a Size equal to 2 Bank restricts the user to 262K. The Size field on any BD is interpreted by a current program to provide legal results for the current program. The current program may access as far into the Bank as the smaller of the target Bank Upper Limit and the peephole Bank Upper Limit. The subsetting of the Peephole BD may provide any legal Offset into the Size equal 2, or any other Size, Bank Descriptor. Code Banks are still required to exist in small Banks because the Program Address Register (P) is limited to 18 bits (or the remainder of the Bank cannot be accessed as instructions). The programmer can place all code Banks in the first 215 BDIs of the Bank Descriptor Table. Code Banks can exist at larger numbered BDIs. For existing code to invoke code Banks with a BDI greater than 215, the Bank Descriptor can be moved (destructively copied via the Unsave instruction described below) to an L less than 7 and BDI less than 215 for normal access. Peepholes exist in L less than 7 and BDIs less than 2**15 (or, stated another way, Peepholes are always visible as 1-word VAs).

In the 2200 Series computer architecture before the present invention, any Large Bank has multiple BDs to describe the storage space. Thus a program can access every word of a Large Bank either (1) by basing the first word of the Bank and using index incrementation of 24-bit indexing to reference the Bank; or (2) by directly basing each word of the Bank by subsetting the Virtual Address, or (3) by a combination of subsetting and indexing, or (4) loading subsequent banks (which is actually equivalent to subsetting the Very Large bank) and indexing. These methods produce the same results for the first 16M words of memory (assuming 24-bit indexing). When Bank Descriptors are permitted to describe spaces larger than 224 (or even larger than 236) and when BDI+1 describes some independent space, incrementing the VA and incrementing an index from the base provide the same results for 262K, but then they provide different results. This is a major change in addressing. The Very Large Bank concept permits the overflow from the offset (index portion) of the VA to select the next BDI. The next BDI describes more of the Very Large Bank. For Size equals 2, a single BD describes the whole Bank. For Size equals 2, when the offset portion of a peephole VA is exceeded, the next BDI need not be another peephole describing the subsequent space.

A Load Base Register, User (LBU) instruction of an S equal to 2 Bank provides an Upper Limit of 262K or the Bank's Upper Limit, whichever is smaller. This method clearly separates the users of multiple-word VAs from the users of 1-word VAs so that current programs do not encounter different data when indexing than when incrementing the VA. Setting Size equal to 2 provides the key that only 262K of visibility is provided if the BD is directly loaded via a normal LBU instruction. With that case, there are two different ways to handle Size equal to 1 Banks. First, for 16M word spaces and Size equal to 1, the BD may be required to have 64 (or as many as the size of the Bank less than 16M) BDIs such that incrementing VA provides the same access as incrementing index. For other Banks larger than 262K, define them to be Size equal to 2. Converting existing Size equal to 1 Banks to Size equal to 2 Banks requires changes to the programs that access those Banks; defining Banks as Size equal to 2 is only suitable for new or expanded Banks already requiring program changes. Even though all currently defined Banks could be described as Size equal to 2 Banks (word-granular upper limit allows restricting a Size equal to 2 Bank to one word, if desired), Size equal to 1 Banks are required to for Very Large Banks of Extended Mode, and Size equal to 0 Banks are required for both code Banks and Basic Mode. The present invention permits the Banks for the Bank Descriptor Table to have Size equal to 2. This permits the BDT to contain many more BDIs than a Bank with Size equal to 0 can contain.

A Peephole is a series of one or more BDIs that point to a target BD. A peephole gives a window of visibility to an area of virtual memory to a program. To access data via a Peephole, a Peephole (PHOL) instruction is executed to set up the Peephole, and an LBU instruction is executed to base the Peephole. The Peephole is defined to overlay specified areas of memory. Peepholing does not copy the data described by the BD. Peepholing does not change the Absolute Address (or Real Address, if any) of the data described by the BD. Peepholing provides a subsetted BD for programs to access the appropriate data. To pass a current program a Peephole of 262K words, the multiple-word VA user must first make a procedure call to the Operating System, to create a Peephole of the size needed. The Operating System builds a BDI described as one Peephole. For example, the BDI created by the Operating System has the following information: GAP=?, SAP=?, Access Lock=?, Type=Peephole; G=?, S=0; Lower Limit=0; Upper Limit= 00000777777. To pass a current user a Peephole larger than 262K words, the multiple-word VA user program must make a procedure call to the Operating System to create Peepholes of the sizes needed. The Operating System builds a series of BDIs described as one Peephole. For example, if the Peephole created by the Operating System is to have 4 BDIs, the BDIs have the following information: GAP=?, SAP=?, Access Lock=?, Type=Peephole; G=?, S=1 (or 2); Lower Limit=0; Upper Limit=00003777777 (real). The BDIs have DISP=0,1,2,3, respectively. The multiple BDI Peephole is identical to current Very Large Bank viewing.

A new, user executable) instruction called Peephole (PHOL) puts the Virtual Address (VA) of the target Bank Descriptor (BD) into the (first) Bank Descriptor Index (BDI) of the (series of BDIs in the) Peephole and updates the count of Peepholes associated with the target BD. A Peephole must be closed before it can be used for a different target BD. This closing purges any Base Register and/or Active Base Table (ABT) entry specifying the Peephole. The Peephole may be closed via a new, user executable instruction called Close (CLOS).

The Save BD instruction (SBD) permits moving the contents of a Bank Descriptor from an L less than 7 and BDI less than 215 to an L greater than 6 or a BDI greater than 215 or to an L less than 7 and a BDI less than 215. The Unsave BD instruction (UBD) permits moving the contents of a Bank Descriptor from an L greater than 6 or a BDI greater than 215 or from an L less than 7 and a BDI less than 215 to an L less than 7 and a BDI less than 215. In either case, the contents of the source BD are copied to the destination BD, then the contents of the source BD are changed such that the source BD provides no access if it were the target of an LBU instruction. With the Unsave (UBD) instruction, any BD with an L greater than 6 or a BDI greater than 215 can be destructively copied to a BD with an L less than 7 and a BDI less than 215 so that it can be directly accessed as code or data.

The SBD and UBD instructions can be used to individually save a very large number of BDs in such a manner than the BDs can be directly recalled. (Putting the Queue Bank Descriptors (QBDs) onto a Queue may require searching the entire Queue to find the desired entry.) Example: a Communications Program message save area for QBDs that have been sent but not yet acknowledged; the acknowledges or re-transmission requests may be processed out of order; whereas Queues are suitable for processing items in order only.

Saving the contents of a BD from an L less than 7 and a BDI less than 215 to an L greater than 6 or a BDI greater than 215 does not require Unsaving the BD to access it; the contents of the Saved BD can also be accessed via a Peephole. Code banks are not accessed via a Peephole. Therefore, code Banks with an L greater than 6 or a BDI greater than 2**15 must be Uusaved before they can be invoked.

As stated immediately above, four new instructions were added to the instruction set architecture to implement the present invention. The first new instruction is called "Peephole" (PHOL). The PHOL instruction opens a Peephole into virtual memory thereby allowing the Peephole to be loaded via an LBU instruction, which gives access to the Bank data. The general register has a value of (Aa)=L,BDI to specify the Peephole to be loaded. Either (U)=1-word VA or (U)= multi-word VA to be loaded (recall that the L in the first word of the VA indicates a 1-word VA if L is less than 7 and multi-word VA if L=7). The Peephole instruction defines a series of one or more BDIs to point to another Bank Descriptor. The series of BDIs of the Peephole is determined by the DISP field of subsequent BDIs not being zero. The value in general register Aa.L,BDI is the 18 most significant bits of the 1-word VA of the Peephole target BD. The BD(Aa.L,BDI) must be an available Peephole. Peephole updates the Count of Peepholes open to the BD(U.VA). In the preferred embodiment, the Peephole instruction writes either the 1-word VA of the peepholed BD to word 11 of the BD(Aa.L,BDI) or writes the multi-word VA of the peepholed BD to words 11 and following locations of the BD(Aa.L,BDI). The instruction does not complete successfully if either VA is improper. It is legal to peephole any size BD. The visibility through a Peephole is limited by the smaller of the number of BDIs in the Peephole and the (remaining portion of) the target Bank. The following status is provided in register (Aa+1): 1. (Aa+1)=0≧success; 2. (Aa+1)=1≧improper BD(Aa.L,BDI); 3. (Aa+1)= 2≧improper BD(U.L,BDI); 4. (Aa+1)=3≧improper BD(Aa.L,BDI) and BD(U.L,BDI) (optional). In the event that both BDs are detected as improper, either error may be reported or both may be reported.

The second new instruction is called Close (CLOS). This instruction closes a Peephole. General register value is (Aa)=L,BDI,0 of 1-word VA to be closed as a peephole and (U)=0 (uses the same operation code as PHOL). The CLOS instruction has the opposite effect of Peephole: CLOS clears the pointed-to link in the Peephole Bank Descriptor. The instruction does not complete successfully if the VA is improper. Specifying the L,BDI of any of the series of BDIs for the Peephole can close the entire Peephole since BD(Aa).DISP indicates the beginning BDI of the Peephole. If BD(Aa.L,BDI).DISP is not equal to 0, then Aa is modified to reflect the L,BDI for DISP equal to 0. For the Peephole BD, words 11–12 are cleared and the BD is marked as available. For the BD specified by words 11 and following locations of BD(Aa), the Count of Peepholes is decremented. The CLOS instruction flushes any entries for the closed Peephole from the Active Base Table (ABT), which indicates the Banks that are associated with each of the Base Register, and from the Base Registers. The following status is provided in register (Aa+1): 1. (Aa+1)=0≧success; 2. (Aa+1)=1≧improper BD(Aa.L,BDI).

The third new instruction is called Save Bank Descriptor (SBD). This instruction destructively copies a BD from an L less than 7 and a BDI less than 215 to an L less than 7 and a BDI less than 215 or to an L greater than 6 or a BDI greater than 215. The general register has the value of (Aa)=L,BDI,0 of 1-word VA of the non-Indirect, non-Peephole BD to be saved. Either the contents of U equals the 1-word VA or the contents of U equals the multi-word VA of the BDI for saving the BD. The instruction does not complete successfully (1) if the BD(U.VA) is non-zero, (2) if the U.BDI is out of range of its BDT, (3) if the BD(Aa.L,BDI) is an Indirect or Peephole BD, (4) if the BD(Aa.BDI) is out of range of its BDT, (5) if the BD(Aa.L,BDI) is void, (6) if the BD(Aa.L,BDI) has a Peephole Count greater than 0, or (7) if the BD(Aa.L,BDI) is one of a series of BDIs describing one logical Bank (has DISP greater than 0 or S equal to 1). The contents of the BD(Aa.L,BDI) are copied to the contents of the BD(U.VA); then zeroes are stored in the BD(Aa.L,BDI). The SBD instruction flushes any entries for the saved BD(Aa.L,BDI) from the ABT and from the Base Registers. The multiple-word VA need not specify an L numbered higher than 7 or a BDI numbered higher than 215. The following status is provided in register (Aa+1): 1. (Aa+1)=0≧success; 2. (Aa+1)=1≧improper BD(Aa.L, BDI); 3. (Aa+1)=2≧improper BD(U.L,BDI); 4. (Aa+1)= 3≧improper BD(Aa.L,BDI) and BD(U.L,BDI) (optional). In the event that both BDs are detected as improper, either error may be reported or both may be reported.

The fourth new instruction is called Unsave Bank Descriptor (UBD). This instruction destructively copies the BD of the specified L greater than 6 or BDI greater than 215, or destructively copies the BD of the specified L less than 7 and BDI less than 215 to the L less than 7 and BDI less than 215 specified by register Aa. The general register has the value of (Aa)=L,BDI,0 of 1-word VA of the void BD to become the unsaved BD. Either the contents of U equals the 1-word VA or the contents of U equals the multi-word VA of the BDI for the saved BD. The UBD instruction does not complete successfully (1) if the BD(Aa.L,BDI) is non-zero, (2) if the U.BDI is out of range of its BDT, (3) if the Aa.BDI is out of range of its BDT, (4) if the BD(U.L,BDI) is an Indirect or Peephole BD, (5) if the BD(U.L,BDI) is void, (6) if the BD(U.L,BDI) has a Peephole Count>0, or (7) if the BD(U.L,BDI) is one of a series of BDIs describing one logical Bank (has DISP greater than 0 or S equal to 1). The contents of the BD(U.L,BDI) are copied to the contents of the BD(Aa.L,BDI); then zeroes are stored in the BD(U.L, BDI). The UBD instruction flushes any entries for the unsaved BD(U.L,BDI) from the ABT and from the Base Registers. The multi-word VA need not specify an L numbered higher than 7 or a BDI numbered higher than 215. The following status is provided in register (Aa+1): 1.

(Aa+1)=0≧success; 2. (Aa+1)=1≧improper BD(Aa.L, BDI); 3. (Aa+1)=2≧improper BD(U.L,BDI); 4. (Aa+1)=3≧improper BD(Aa.L,BDI) and BD(U.L,BDI) (optional). In the event that both BDs are detected as improper, either error may be reported or both may be reported.

Figure 5:
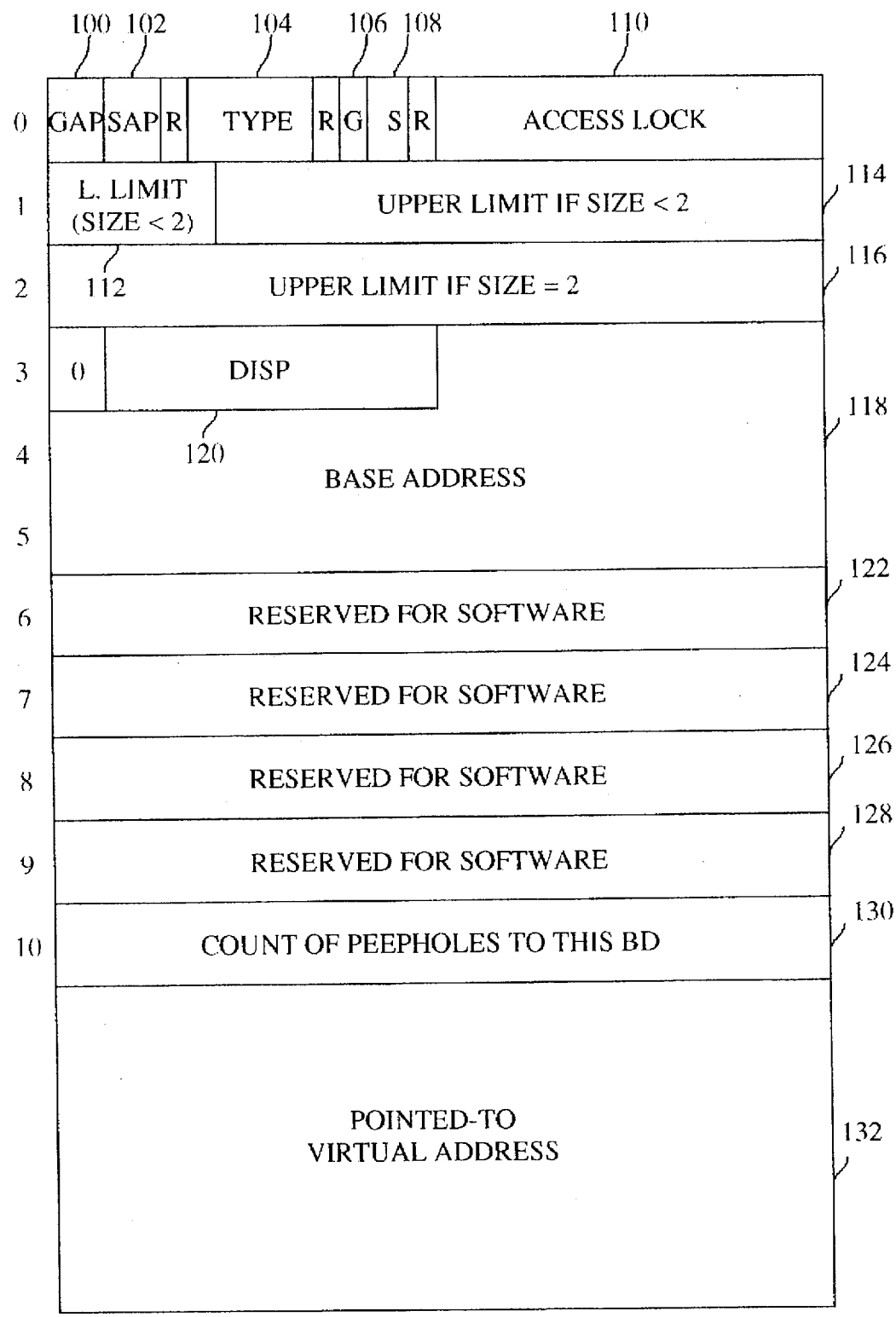
FIG. 5 is a diagram of a Bank Descriptor.

The Bank Descriptor format was modified to accommodate the new multiple word Virtual Address of the present invention. Changes in the sizes and/or order of fields within the Bank Descriptor are invisible to user programs. FIG. 5 is a diagram of a Bank Descriptor. The General Access Permission (GAP) field 100 in Bits 0–2 of Word 0, defines the general read, write, and execute permissions for the referenced Bank. The Special Access Permission (SAP) field 102 in Bits 3–5 of Word 0 defines the special read, write, and execute permissions for the Bank. Bits 6–7, 12, and 16–17 of Word 0 are Reserved (RES). The TYPE field 104 in Bits 8–11 of Word 0 defines the type of Bank. Possible values are 0 for Extended Mode Bank; 1 for Basic Mode Bank; 2 for Gate Bank; 3 for Indirect Banks; 4 for Queue Banks; and 5 for Peephole Banks. The G field 106 in Bit 13 of Word 0 is for generating a General Fault addressing interrupt when the Bank is referenced and G=1. The Size (S) field 108 in Bits 14–15 of Word 0 denote the size type of the Bank. If Size equals 2, a Lower Limit of zero is implied, and an Upper Limit is 72 bits. The Access Lock field 110 in Bits 18–35 of Word 0 is used for checking against the Access Key of the user to determine if access to the Bank is allowed. The Lower Limit (L.LIMIT) field 112 in Bits 0–8 of Word 1 of a Bank Descriptor specifies the lower limit of the Bank. It is considered to be zero when Size equals 2. If Size is less than 2, the Upper Limit field 114 specifies the Upper Limit of the last word in the Bank that can be referenced. If Size equals 2, then the fields identified as 112, 114, and 116 specify the Upper Limit of the last word in the bank that can be referenced. Which Upper Limit field is used depends on the Size field. The Base Address field 118 is the 90-bit Absolute Address of the Bank. If the number of words of the BD are increased, the size of the Absolute Address field can be increased. The Displacement field 120 represents the relative location of this BD to a series of BDs that describe part of a Very Large Bank. It is ignored when Size=2. Words 6–10, labeled 122, 124, 126, 128, and 130, respectively, are Reserved for Software use. The Count of Peepholes to this BD field 130 holds the number of Peepholes that are open for this Bank Descriptor when TYPE<>Peephole. Otherwise, it is undefined. The Pointed-To Virtual Address field 132 holds either the 1-word VA or a multiple-word VA.

Fields may need to be zero-extended in the most significant bit positions to permit valid comparisons. For instance, if the user specifies three words of Offset in a multiple-word VA and the Upper Limit field is only two words, the reference may be considered legal if the most significant 36 bits of the Offset are zero and the least significant 72 bits are less than the Upper Limit as interpreted by Size. Alternatively, specifying three words of Offset may be considered illegal for any hardware implementation with a 2-word Upper Limit.

Figure 6:
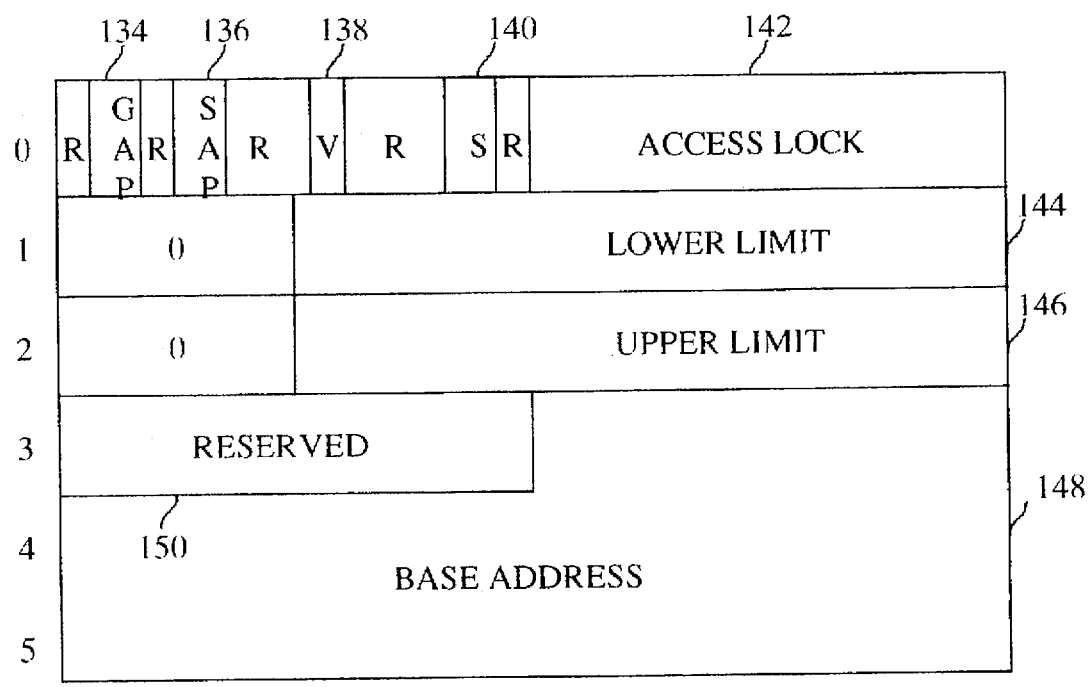
FIG. 6 is a diagram of a Base Register.

The Base Register format was also modified to accommodate the new multiple word Virtual Address of the present invention. Changes in the sizes and/or order of fields within the Base Register are invisible to user software. FIG. 6 is a diagram of the Base Register. The General Access Permission (GAP) field 134 in Bits 1–2 of Word 0, defines the general read and write permissions for the Bank. The Special Access Permission (SAP) field 136 in Bits 4–5 of Word 0 defines the special read and write permissions for the Bank. The Void (V) field 138 if zero, indicates that the Base Register contains valid information. The Size (S) field 140 in Bits 14–15 of Word 0 denote the size type of the Bank. If Size equals 2, a Lower Limit of zero is implied, and an Upper Limit is 72 bits (or even larger if the Base Register is increased in size). Bits 0, 3, 6–9, 11–13, and 16–17 of Word 0 are Reserved (R). The Access Lock field 142 in Bits 18–35 of Word 0 is compared to the user's Access Key to determine what access is allowed for the user. The Lower Limit field 144 in Bits 9–35 of Word 1 of the Base Register specifies the lower limit of the Bank. It is considered to be zero when Size equals 2. The Upper Limit field 146 in Bits 9–35 of Word 2 specifies the Upper Limit of the last word in the Bank that can be referenced. The Base Address field 148 is the 90-bit (or larger if the Base Register is increased in size) Absolute Address of the Bank. Bits 0–17 of Word 3 are Reserved 150.

Figure 7:
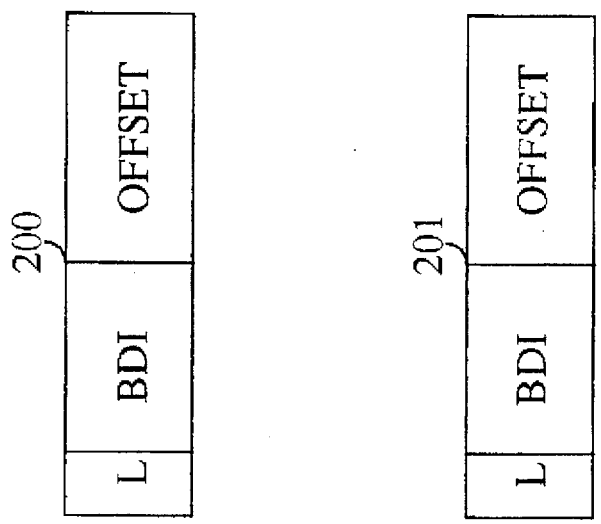
FIG. 7 is a diagram of an example of Virtual to Absolute address translation using a 1-word Virtual Address in a system instantiating a 1-word Virtual Address (prior art).

FIG. 7 is a prior art diagram of an example of Virtual to Absolute address translation using a 1-word Virtual Address in a 1-word instantiation. Each field of the Virtual Address 200 is interpreted as a fixed size from a fixed location. The Virtual Address supported by the hardware 201 matches the 1-word VA.

Figure 8:
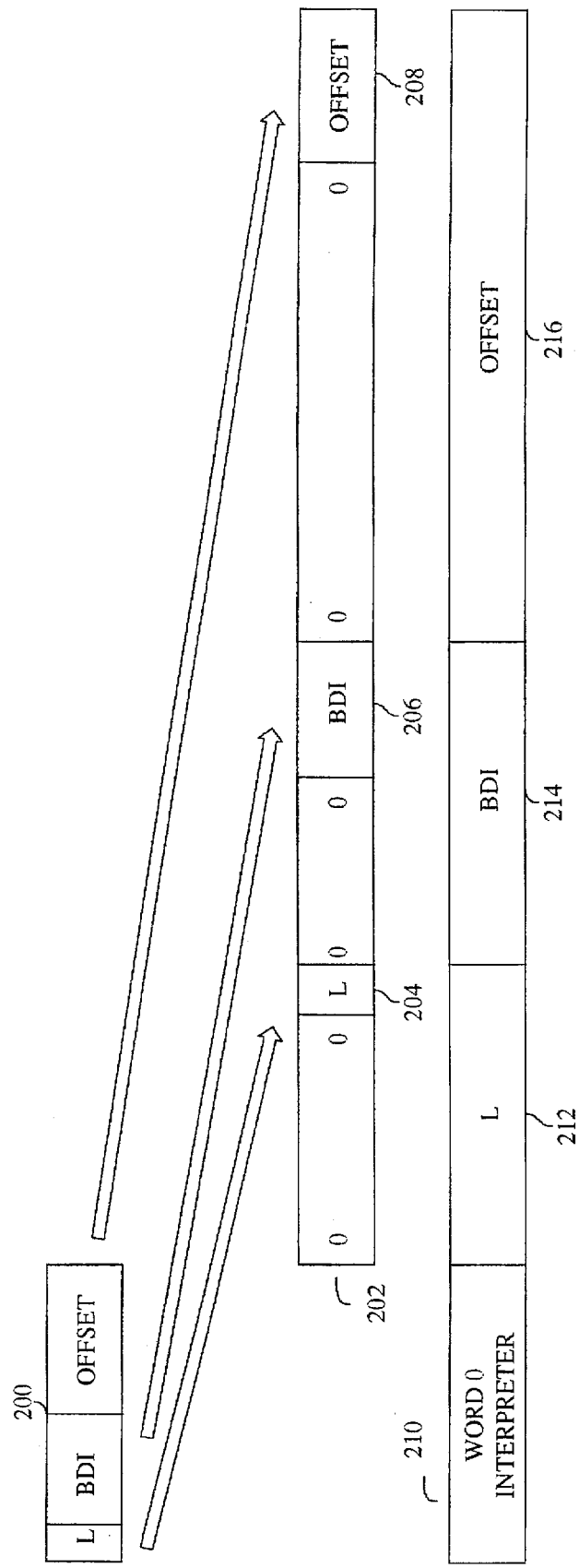
FIG. 8 is a diagram of an example of Virtual to Absolute address translation using a 1-word Virtual Address in a system instantiating a 5-word Virtual Address.
Figure 9:
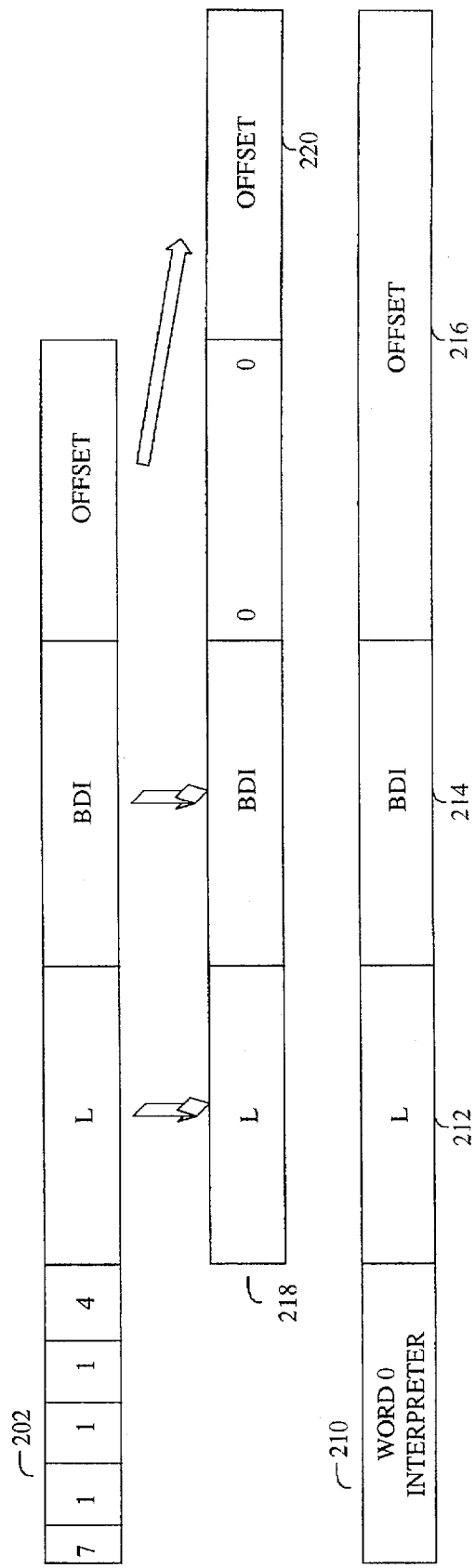
FIG. 9 is a diagram of an example of Virtual to Absolute address translation using a 4-word Virtual Address in a system instantiating a 5-word Virtual Address.
Figure 10:
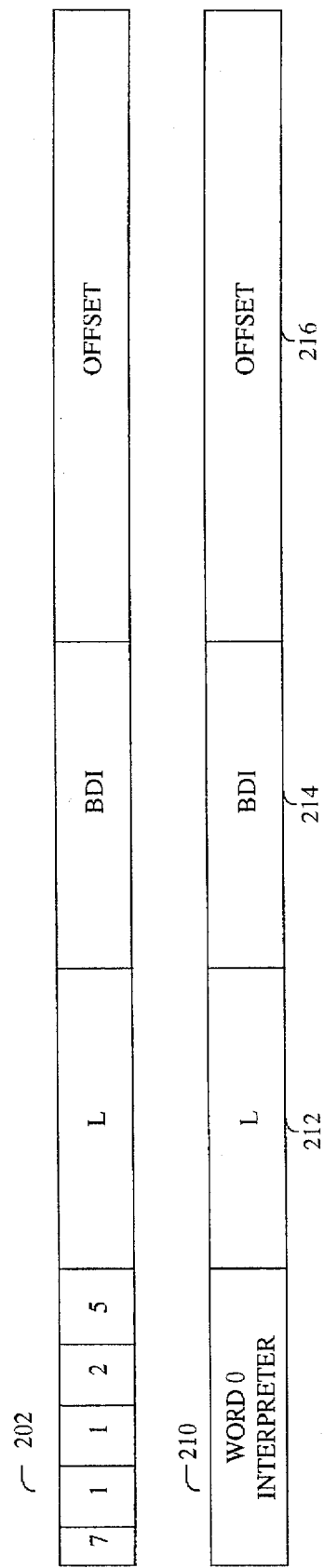
FIG. 10 is a diagram of an example of Virtual to Absolute address translation using a 5-word Virtual Address in a system instantiating a 5-word Virtual Address.

FIGS. 8 through 10 show examples of Virtual to Absolute address translation based on a 5-word Virtual Address. The 5-word example demonstrates the flexibility of the present invention. The example shows a 1-word L, a 1-word BDI, and a 2-word Offset, but the 5-word configuration could have been a 2-word L, a 1-word BDI, and a 1-word Offset or a 1-word L, a 2-word BDI, and a 1-word Offset.

FIG. 8 is a diagram of an example of Virtual to Absolute address translation using a 1-word Virtual Address in a system instantiating a 5-word Virtual Address. Assume for purposes of this example that a computer architecture has been designed to support an operand path having five 36-bit words instead of one 36-bit word. According to the present invention, the existing 1-word Virtual Address 200 is interpreted in Memory Location 202 as the Level (L) 204, the Bank Descriptor Index (BDI) 206, and the Offset 208. This 1-word Virtual Address is used by programs written prior to the expansion of the operand path from one word to five words or written after the expansion for Banks (such as Small Banks) that do not need larger sizes, a Level greater than 6, or a BDI greater than 32767. The 1-word VA still works with the new operand path according to the present invention because the remaining bit positions are considered to be zero-filled in Memory Location 202. With the operand path expansion, the hardware supports a multiple-word Virtual Address 210 as shown. The multiple-word VA 210 has fields for L 212, BDI, 214, and Offset 216.

FIG. 9 is a diagram of an example of Virtual to Absolute address translation using a 4-word Virtual Address in a system instantiating a 5-word Virtual Address. Assume again that the operand path has been expanded to five words. However, in this example, the VA contains four words. The initial word of the VA 202 is interpreted as the number of words of each of L, BDI, and Offset that immediately follow. The 4-word VA 218 works with the new operand path according to the present invention because the remaining bit positions in the Offset field 220 are considered to be zero filled. Multiple-word VA 210 is supported by the hardware.

FIG. 10 is a diagram of an example of Virtual to Absolute address translation using a 5-word Virtual Address in a system instantiating a 5-word Virtual Address. In this example, the multiple-word VA contains five words, which matches the five-word VA maximum supported by the hardware. Hence, after the initial word of the VA 202 is interpreted as the number of words of each of L, BDI, and Offset that immediately follow, the L, BDI, and Offset fields are used as the multiple-word VA 210.

One skilled in the art can see by the previous three examples how the present invention may be used to flexibly expand the virtual address of a selected computer architecture. The size of the VA may be changed to match a new size of an operand path. Alternatively, it does not have to match the size of the operand path. Also, just because a particular field has been expanded to one or more words in size, the hardware may limit the number of addressing bits that may be used in a particular field to match the hardware implementation. Thus, for example, the L field could be restricted to 3 bits in size, the BDI field could be restricted to 17 bits, and the Offset field could be restricted to 38 bits. Subsequent hardware implementations could expand the supported sizes of these fields up to any maximum (36, 36, and 72 bits, respectively) without changing the system architecture.

The present invention will also become clearer to one skilled in the art by way of some examples of using peepholes to access virtual memory. First, assume a computer program is stored in two Banks, each of size 240 words. Each Bank is a 220×2**20 matrix of single words. Of course, in computer architectures other than the one being discussed herein, the number of words in a bank or block of memory could vary; the Bank size and matrix sizes stated above are for illustrative purposes. The program makes two procedure calls to the Operating System to create two available Peepholes. Each available Peephole contains 16 million words.

The sample Banks are shown in Table I below.

TABLE I

Label: HMATRIX (not directly visible with 1-word VA)
VA: L = 6, BDI = 0100000, Offset = 0
TYPE = Extended, S = 2, UPPER LIMIT = 017777777777777,
(implied LOWER LIMIT = 0), Count of Peepholes = 0.
Label: VMATRIX (not directly visible with 1-word VA)
VA: L = 6, BDI = 0100001, Offset = 0
TYPE = Extended, S = 2, UPPER LIMIT = 017777777777777,
(implied LOWER LIMIT = 0), Count of Peepholes = 0.
Label: TINY
VA: L = 6, BDI = 0100, Offset = 0
TYPE = Extended, S = 0, LOWER LIMIT = 0,
UPPER LIMIT = 0777777, Count of Peepholes = 0
Label: TINYTOO (not directly visible with 1-word VA)
VA: L = 6, BDI = 0100002, Offset = 0
TYPE = Extended, S = 0, LOWER LIMIT = 0,
UPPER LIMIT = 0777777, Count of Peepholes = 0

The sample Peepholes are shown below in Table II.

TABLE II

Label: PROW
VA: L = 6, BDI = 0130–0227, Offset = 0
LOCK = program's KEY, TYPE = PEEPHOLE
G = 0, DISP = 0–077, Pointed-to VA = 0, S = 1, GAP = R/W,
LOWER LIMIT = 0, real UPPER LIMIT = 077777777
Label: PCOL
VA: L = 6, BDI = 0230–0327, Offset = 0
LOCK = program's KEY, TYPE = PEEPHOLE
G = 0, DISP = 0–077, Pointed-to VA = 0, S = 1, GAP = R/W,
LOWER LIMIT = 0, real UPPER LIMIT = 077777777

Sample data items are shown in Table III.

TABLE III

| col | res | 1 | .number of columns done |
|---|---|---|---|

BigVAH
    0701, 1, 2, 5
    6
    0100000
    0
    0

TABLE III-continued

BigVAV
    0701, 1, 2, 5
    6
    0100001
    0
    0

Next, an example of accessing data through a Peephole is shown. The part of the hypothetical computer program described hem is to make one pass through the two matrices, accessing VMATRIX by columns and HMATRIX by rows. What the program actually does with the data is not relevant to understanding the present invention. However, how the program addresses the matrices is exemplary of the present invention. Table IV shows a code fragment illustrating the use of Peepholes to access virtual memory.

TABLE IV

| | | |
|---|---|---|
| start | | |
| L | A13, 02000000 | .# columns to do |
| L | A12, PROW | .HMATRIX peephole |
| L | A14, PCOL | .VMATRIX peephole |
| SZ | BigVAR + 3 | .initialize |
| SZ | BigVAH + 4 | .peephole |
| SZ | BigVAV + 3 | .offsets |
| SZ | BigVAV + 4 | . |
| SZ | col | .columns processed |
| rowloop | | . |
| L | A11, *(02000000) | .# in rows |
| LX | X3, *(0100000000) | .row index: inc = 1, mod = 0 |
| PHOL | A12, BigVAH | .peephole to row |
| LBU | B2, PROW | .base the row |
| colstart | | . |
| LX | X5, 15 | .column entries per 16M |
| LX | X14, *(0) | .col mod = 0 |
| PHOL | A14, BigVAV | .peephole to part of col |
| LBU | B3, PCOL | .base part of col |
| colloop | | . |
| L | A9, *0, *X3, B2 | .HMATRIX access, inc X3 |
| L | A10, *0, X14, B3 | .VMATRIX access |
| A | A2, (02000000) | .inc X14 |
| . | | . |
| . | | .do something |
| . | | .with data |
| . | | . |
| JGD | X5, colloop | .still within peephole |
| | | .need new peephole |
| CLOS | A14 | .close PCOL peephole |
| | | .flushes PCOL from ABT |
| | | .and Base Registers |
| DL | A7, BigVAV + 3 | . |
| DA | A7, (0100000000) | .calculate next V peep |
| DS | A7, BigVAV + 3 | . |
| ANA, U | A11, 15 | . |
| JGD | A11, colstart | .not end of row |
| | | .end of row |
| CLOS | A12 | .close PROW peephole |
| | | .flushes PROW from ABT & |
| | | .flushes Base Registers |
| DL | A7, BigVAH + 3 | . |
| DA | A7, (0100000000) | .calculate next H peephole |
| DS | A7, BigVAH + 3 | . |
| L | A5, col | .one row/col completed |
| AA | A5, 1 | .one column completed |
| S | A5, col | . |
| MI | A5, (02000000) | .calculate next col |
| DS | A5, BigVAV + 3 | .next V peep |
| JCD | A13, rowloop | .do next row and col |
| CALL | EXIT$ | .done |

Peepholes to Small Banks are handled as follows. Assume a program with the same peephole PROW above. Use PROW to peephole to arbitrary Banks, labeled TINY and TINYTOO, that happen to have Size=0. If the program executes either of the code fragments of Table V or Table VI, then B2 is loaded with Size=0, Lower Limit=0, and Upper Limit=0777777.

TABLE V

| L | A12, PROW | .peephole VA |
|---|---|---|
| PHOL | A12, TINY | . |
| LBU | B2, PROW | .base the peephole |

TABLE VI

| L | A12, PROW | .peephole VA |
|---|---|---|
| PHOL | A12, TINYTOO | . |
| LBU | B2, PROW | .base the peephole |

Even though the Peephole permits 16 million words of visibility, the Base Register is loaded with the smaller of the Peephole visibility and the target bank visibility. If general register A12 were loaded with L=6, BDI=0130, Offset= 01000, before executing the PHOL instruction, then general register B2 would be loaded with Size=0, Lower Limit=0, and Upper Limit=0776777. If general register A12 were loaded with L=6, BDI=0131, Offset=anything, before executing the PHOL instruction, then general register B2 would be loaded with V=1 to prevent any access.

Table VII shows an example of using Peepholes with a higher level language. This example shows a program that invokes the C function "realloc." Both source code and object code fragments are shown in Table VII. Using the Standard Calling Sequence, realloc is passed a 2-word virtual address (VA) (1-word VA in the first word plus a byte offset in the second word) and a 1-word Size. Realloc finds an area as large as Size; and, if the area is new, copies the old data to the new area; and returns a 2-word VA for the (new) location. In this example, the program must establish a peephole to the data before the data can be referenced by either the program or by realloc. The example requires no change to realloc.

TABLE VII

| | SOURCE CODE LISTING | | |
|---|---|---|---|
| 1 | #include <stdlib.h> | | |
| 2 | void *MyFunction(void *MyPointer, int MySize) | | |
| 3 | { | | |
| 4 | | | |
| 5 | /* realloc changes the size of the object pointed to by    */ | | |
| 6 | /* MyPointer (a 2-word pointer) to MySize (a 1-word integer)    .*/ | | |
| 7 | /* realloc returns a 2-word pointer to the new space in    */ | | |
| 8 | /* registers A0 & A1.    */ | | |
| 9 | | | |
| 10 | return(realloc(MyPointer, MySize)); | | |
| 11 | } | | |
| GENERATED CODE LISTING | | | |
| | R | 0 | VA Pointer |
| | R | 1 | Base Address |
| | + | (+33286783557) | |
| | + | (−17179869055) | |
| | + | (−34359738239) | |
| BigVA | | | |
| | | 0701, 1, 2, 5 | |
| | | 6 | |
| | | 0100000 | |
| | | 0 | |
| | | 0 | |
| | Close | 0 | |
| Prolog for MyFunction | | | |
| | LBU | B8, R0 | |
| | BUY | *034, *X10, B1 | |
| | SR | R0, *03, X10, B1 | |
| 2 | | void *MyFunction(void *MyPointer, int MySize) | |
| 3 | | { | |
| 4 | | | |
| 5 | | /* realloc changes the size of the object pointed to by    */ | |
| 6 | | /* MyPointer (a 2-word pointer) to MySize (a 1-word integer).    */ | |
| 7 | | /* realloc returns a 2-word pointer to the new space in    */ | |
| 8 | | /* registers A0 & A1    */ | |
| 9 | | | |
| CGL001004 | | | |
| 10 | | return(realloc(MyPointer, MySize)); | |
| 11 | | } | |
| | L | A12, (−17179869055),, B8 | |
| | PHOL | A12, BigVA | |
| | LX | X7, (−17179869055),, B8 | |

TABLE VII-continued

```
         SX      X7, *CGV026, X10, B1
         LBU     B7, A1
         LX      X8, MyPointer,, B7
         SX      X8, *CGV01 + 027, X10, B1
         LA      A5, MyPointer,, B7
         SA      A5, *CGV00 + 027, X10, B1
         LA      A6, (-34359738239),, B8
         SA      A6, *CGV026 + 03, X10, B1
         LA      A7, MySize,, B7
         SA      A7, *032, X10, B1
         LA      A1, R12
         AA, U   A1, CGV026, X10
         LA, U   A0, 2
         UCS$CODELVE 'UCS$EMUSER' 'realloc'
         .Call to realloc
         LR      R0, 06,, B8
         CALL    05,, B8
                                               .A0, A1 contains the result
         LBU     B8, *03, X10, B1
                                               .Epilog for MyFunction
CGL001025

AX, U   X10, 28
         CLOS    A12, Close
                                               .flushes L6, BDI0 from
                                               .ABT & Base Registers
         RTN
```

Peepholes for Queue Banks (QBs) are also supported. Queue Banks and the Queuing Architecture are described in "System Architecture for Improved Message Passing and Process Synchronization Between Concurrently Executing Processes", Ser. No. 08/362,632, invented by Merwin H. Alferness, et al., and herein incorporated by reference. Support of queuing for QBDs that are described by a single BD is provided by the present invention according to the following rules (note that Size=1 BDs cannot be queued since the system architecture requires multiple BDIs to describe the space). Banks having Size equal to 2 can be enqueued with an Enqueue Instruction. If the QBD peephole Count is 0, then Enqueue of a QBD is legal. If QBD peephole Count is greater than 0, then Enqueue of a QBD is not permitted. Dequeue of a Bank having Size equal to 2 by an existing program is permitted. The QBD must exist such that BDI is less than $2^{}15$. Executing an LBU instruction to load a Bank Size equals 2 permits visibility to only 262K to prevent the user from having different access via indexing through the Bank than through 1-word VAs. Enqueuing any BDI of a Peephole is legal if the Peephole's Count is 1. Enqueuing a Peephole lets the Peephole continue to peephole to the ("inactive") QBD. Enqueuing a Peephole does not require flushing the Peephole's L and BDI values from the ABT and Base Registers: the Peephole points to an inactive QBD, so no access to data is provided. Enqueuing a Peephole permits a Saved BD to be enqueued from a BDI greater than $2^{}15$ without first Unsaving the BD to a BDI less than $2^{}15$. Dequeuing to a Peephole allows the QBD to always exist at a BDI greater than $2^{}15$. If in the general case, compilers generate Peepholes to queued text references, the QBDs may as well be created at BDIs greater than $2^{**}15$ in the first place. Dequeuing any BDI of a Peephole is legal if the Peephole's Count is 1 and the pointed-to QBD is "inactive." It is possible to establish a Peephole to an "inactive QBD." If QBD Peephole's Count is greater than 0, then Enqueue of a QBD is not permitted.

The present invention also supports using an expanded set of Bank Descriptors (BDs) according to the following rules. Consider Bank Descriptor Indices (BDIs) which are less than $2^{}15$ to be "active" BDIs both for Peepholes and for QBDs. BDs of any size are permitted to be described at BDIs less than $2^{}15$ and at BDIs greater than $2^{}15$, but Peephole BDs may exist only at BDIs less than $2^{}15$. QBDs (of Size equals 2) are required to be dequeued to a BDI less than $2^{**}15$. If the QBD is loaded with an LBU instruction, visibility is allowed to only 262K of memory. But Peepholes to the QBD can be generated. Multiple Peepholes are permitted to any non-Indirect, non-Peephole BD, including QBDs with Size equals 2. A Dequeue operation is permitted only to an inactive QBD or to a Peephole to an inactive QBD. The QBD takes its Upper Limit and Size from the QBD on the Queue, whatever Size and Upper Limit that may be. The Enqueue and Dequeue instructions must specify the QBD via the 1-word VA in (Aa) and specify the Queue via either a 1-word or a multi-word VA in (U).

Examples of using Peepholes with Queuing Architecture are shown below. For this series of examples, the program calls the Operating System to establish Queue Bank Descriptors (QBDs), Queue Headers, and Peepholes. Note that some Banks are beyond the normal $2^{**}15$ BDI limit that is visible with a 1-word VA. Sample Inactive QBDs are shown in Table VIII.

TABLE VIII

VA: L = 6, BDI = 440, Offset = 0
ACT = 0, LOCK = program's KEY, TYPE = QI
G = 0, DISP = 0, COUNT = 0, Pointed-to VA = 0
GAP, SAP, S, LOWER LIMIT, UPPER LIMIT, and BASE ADDRESS are undefined
VA: L = 6, BDI = 441, Offset = 0
ACT = 0, LOCK = program's KEY, TYPE = QI
G = 0, DISP = 0, COUNT = 0, Pointed-to VA = 0
GAP, SAP, S, LOWER LIMIT, UPPER LIMIT, and BASE ADDRESS are undefined
VA: L = 6, BDI = 0100010, Offset = 0
ACT = 0, LOCK = program's KEY, TYPE = QI
G = 0, DISP = 0, COUNT = 0, Pointed-to VA = 0
GAP, SAP, S, LOWER LIMIT, UPPER LIMIT, and BASE ADDRESS are undefined
VA: L = 6, BDI = 0100011, Offset = 0
ACT = 0, LOCK = program's KEY, TYPE = QI

TABLE VIII-continued

G = 0, DISP = 0, COUNT = 0, Pointed-to VA = 0
GAP, SAP, S, LOWER LIMIT, UPPER LIMIT, and BASE ADDRESS are undefined Sample Queue Headers are shown in Table IX.

TABLE IX

Label: AVPOOL not directly visible with 1-word VA
VA: L = 4, BDI = 0101000, Offset = 0
GAP = R
Label: INQUE
VA: L = 6, BDI = 0600, Offset = 0
GAP = R
Label: OUTQUE not directly visible with 1-word VA
VA: L = 6, BDI = 0100610, Offset = 0
SAP = E, LOCK = program's KEY, RETAIN = 0

Sample Peepholes are shown in Table X.

TABLE X

VA: L = 6, BDI = 0130–227, Offset = 0
LOCK = program's KEY, TYPE = PEEPHOLE
G = 0, DISP = 0–0100, Pointed-to VA = 0, S = 1, GAP = R/W,
LOWER LIMIT = 0, real UPPER LIMIT = 077777777
VA: L = 6, BDI = 0330–427, Offset = 0
LOCK = program's KEY, TYPE = PEEPHOLE
G = 0, DISP = 0–0100, Pointed-to VA = 0, S = 1, GAP = R/W,
LOWER LIMIT = 0, real UPPER LIMIT = 077777777

Sample Data Items are shown in Table XI.

| | | | |
|---|---|---|---|
| Que1 | 0701, 1, 1, 4 | | .multi-word VA |
| | 4 | | .L |
| | 0101000 | | .BDI |
| | 0 | | .offset |
| Que2 | 0701, 1, 1, 4 | | .multi-word VA |
| | 6 | | .L |
| | 0600 | | .BDI |
| | 0 | | .Offset |
| Que3 | 0701, 1, 1, 4 | | .multi-word VA |
| | 6 | | .L |
| | 0100610 | | .BDI |
| | 0 | | .Offset |
| TEMP1 | 0701, 1, 1, 4 | | .multi-word VA |
| | 6 | | .L |
| | 0100123 | | .BDI |
| | 0 | | .Offset |
| Big1 | | | |
| | 0701, 1, 1, 4 | | .multi-word VA |
| | 6 | | .L |
| | 0100010 | | .BDI |
| | 0 | | .Offset |

An example of a Dequeue of an Inactive Queue Bank Descriptor is shown in Table XII. The program removes a QBD from AVPOOL to an inactive QBD.

TABLE XII

| LA | A5, (0600440000000) | .L6, BDI0440, QBD |
|---|---|---|
| DEQ | A5, Que1 | .get QI |
| LBU | B7, A5 | .get access to QI |
| | | . |
| | | .program performs some |
| | | .useful function |

After performing some useful function, the program Enqueues the QBD to OUTQUE. This is shown in the code fragment of Table XIII.

TABLE XIII

| LA | A5, (0600440000000) | .L6, BDI440, QBD |
|---|---|---|
| ENQ | A5, Que3 | . |
| | | .QBD is now Inactive |
| | | .flushes L6, BDI0440 |
| | | .from ABT & Base |
| | | .Registers |

In Table XIV, a Dequeue or Wait (DEQW) instruction is executed to remove a QBD from INQUE to an inactive QBD. The program performs a useful function, then SAVEs the QBD.

TABLE XIV

| LA | A5,(0600441000000) | .L6, BDI0441, QBD |
|---|---|---|
| DEQW | A5,Que1 | .get QI |
| LBU | B7,A5 | .get access to QI |
| | | .program performs some |
| | | .useful function |
| LA | A5,(0600441000000) | .L6, BDI0441, QBD |
| SBD | A5,TEMP1 | .Saves BDI |
| | | .L6, BDI0441 is no |
| | | .longer a QBD |
| | | .flushes L6, BDI0441 |
| | | .from ABT & Base |
| | | .Registers |

In Table XV, the program wants to UNSAVE the QBD for access to the data or to enqueue to QBD to some queue. The QBD does need not be UNSAVED to the same QBD from which it was originally SAVED.

TABLE XV

| LA | A5,(0600442000000) | .L6, BDI0442, target |
|---|---|---|
| UBD | A5,TEMP1 | .Unsaves BDI |
| | | .L6, BDI0100123 is no |
| | | .longer a QBD |
| | | .L6, BDI0442 is a QBD |
| | | .flushes L6, BDI0100123 |
| | | .from ABT & Base |
| | | .Registers |
| LBU | B9,A5 | .B9 provides access |
| | | .program performs a useful function |

In Table XVI, the program can Dequeue to a Peephole to an inactive QBD, if the QBD has Count=1. First, the program must establish a Peephole to an inactive QBD.

TABLB XVI

| LA | A5,(0600130000000) | .L6, BDI0130 |
|---|---|---|
| PHOL | A5,Big1 | .establish peephole |
| LA | A5,(0600200000000) | .any BDI in peephole |
| DEQ | A5,Que2 | .get QI |
| JZ | A6,tag | .empty |
| LBU | B7,A5 | .access to QBD through |
| | | .Peephole |
| | | .program performs a useful function |

In Table XVII, before Enqueuing a Peephole, the program must close any other Peepholes to the same QBD.

TABLE XVII

| LA | A5,(0600144000000) | .any BDI in peephole |
|---|---|---|
| ENQ | A5,Que3 | .QBD is now Inactive |
| | | .flushes L6, BDI0100010 |
| | | .from ABT & Base |

TABLE XVII-continued

.Registers
.L6, BDI0130-0227 need
.no flushing since would
.peephole to void BD
.Peephole still provides
.access to QBD Algorithms for implementing the Peephole, Close, Save Bank Descriptor, and Unsave Bank Descriptor are shown below in Tables XVIII, XIX, XX, and XXI, respectively.

TABLE XVIII

© 1996 Unisys Corporation
Peephole (PHOL)
1. Fetch U – U+3.
   If Read or Limits error,
      then class 8 interrupt is generated and exit.
2. If U.word 0 = 0,
      then this is a CLOSe instruction. Switch to Close algorithm.
3. If U.VA word 0 specifies larger sizes for L, BDI, Offset, or Number of words of multi-word VA than are supported by this processor,
      then class 8 interrupt is generated and exit.
4. If (U) bits 0–2 = 7 and (U) bits 27–35 > 4,
      then fetch U+4 – U+(U)bits 27–35.
      If Read or Limits error,
         then class 8 interrupt is generated and exit.
5. If Aa.L,BDI or U.L,BDI [1-word or multi-word VA] is less than 0,32,
      then class 8 interrupt is generated and exit.
6. If Aa.L or U.L is greater than 7,
      then class 8 interrupt is generated and exit.
7. If Aa.BDI or U.BDI is not within Limits of respective BDT,
      then class 8 interrupt is generated and exit.
8. If Access Key does not provide Read access (GAP, SAP, Lock checks) to BD(Aa.L,BDI),
      then class 8 interrupt is generated and exit.
9. If BD(Aa.L,BDI).TYPE <> Peephole or
   if BD(Aa.L,BDI).Pointed-to VA.L,BDI <> 0 and <> U.L,BDI, or
   if BD(Aa.L,BDI).DISP <> 0,
      then status 1 → Aa+1 and exit.
10. If BD(U.L,BDI).TYPE = Indirect or Peephole or
    if BD(U.L,BDI).words 0–6 = 0,
       then status 2 → Aa+1 and exit.
    [NOTE: this second check permits a peephole to be built to an Inactive QBD.]
11. Indivisible operation: BD(U.L,BDI).Count + 1 → BD(U.L,BDI) .Count.
12. (U).VA → BD(Aa.L,BDI).Pointed-to VA.
13. Status 0 → Aa+1 and exit.

TABLE XIX

© 1996 Unisys Corporation
Close (CLOS)
1. Fetch U – U+3.
   If Read or Limits error,
      then class 8 interrupt is generated and exit.
2. If U.word 0 <> 0,
      then this is a PHOL instruction. Switch to Peephole algorithm.
3. If (U) bits 0–2 = 7 and (U) bits 27–35 > 4,
      then fetch U+4 – U+(U)bits 27–35.
      If Read or Limits error,
         then class 8 interrupt is generated and exit.
   [NOTE: since this is the Close algorithm, nothing is fetched beyond U+3 because the (U) word 0 = 0. This step is to show commonality with the PHOL algorithm.]
4. If Aa.L,BDI is less than 0,32,
      then class 8 interrupt is generated and exit.
5. If Aa.L is greater than 7,
      then class 8 interrupt is generated and exit.
6. If Aa.BDI is not within Limits of respective BDT,
      then class 8 interrupt is generated and exit.
7. If BD(Aa.L,BDI).TYPE <> Peephole or
   if BD(Aa.L,BDI).Pointed-to VA = 0,

TABLE XIX-continued then status 1 → Aa+1 and exit.
8. If Access Key does not provide Read access (GAP, SAP, Lock checks) to BD(Aa.L,BDI),
      then class 8 interrupt is generated and exit.
9. If BD(Aa.L,BDI).DISP <> 0,
      then Aa.BDI - BD(Aa.BDI).DISP → Aa.BDI.
10. If BD(Aa.L,BDI) Pointed-to VA word 0 = 0,
      then status 1 → Aa+1 and exit.
11. If BD(Aa.L,BDI) Pointed-to VA word 0 specifies larger sizes for L, BDI, Offset, or Number of words in multi-word VA than are supported by this processor,
      then class 9 interrupt is generated and exit.
12. If BD(Aa.L,BDI) Pointed-to L,BDI < 0,32,
      then class 9 interrupt is generated and exit.
13. If BD(Aa.L,BDI) Pointed-to L > 7,
      then class 9 interrupt is generated and exit.
14. If BD(Aa.L,BDI) Pointed-to BDI is not within Limits of respective BDT, then class 9 interrupt is generated and exit.
15. Indivisible operation: BD(BD(Aa.L,BDI).Pointed-to VA).Count - 1 → BD(BD(Aa.L,BDI).Pointed-to VA).Count.
16. 0 → BD(Aa.L,BDI).Pointed-to VA.
17. Flush the BD(Aa.L,BDI) from Base Registers and ABT.
18. Status 0 → Aa+1 and exit.

TABLE XX

© 1996 Unisys Corporation
Save BD (SBD)
1. Fetch U –U+3.
   If Read or Limits error,
      then class 8 interrupt is generated and exit.
2. If U.VA word 0, specifies larger sizes for L, BDI, Offset or Number of words in multi-word VA than are supported by this processor,
      then class 8 interrupt is generated and exit.
3. If (U) bits 0–2 = 7 and (U) bits 27–35 > 4,
      then fetch U+4 – U+(U)bits 27–35.
      If Read or Limits error,
         then class 8 interrupt is generated and exit.
4. If Aa.L,BDI or U.L,BDI [1-word or multi-word VA] is less than 0,32,
      then class 8 interrupt is generated and exit.
5. If Aa.L or U.L is greater than 7,
      then class 8 interrupt is generated and exit.
6. If Aa.BDI or U.BDI is not within Limits of respective BDT,
      then class 8 interrupt is generated and exit.
7. If Access Key does not provide Read access (GAP, SAP, Lock checks) to BD(Aa.L,BDI),
      then class 8 interrupt is generated and exit.
8. If BD(Aa.L,BDI).TYPE = Indirect or Peephole or
   if BD(Aa.L,BDI).Count <> 0 or
   if BD(Aa.L,BDI).SIZE = 1 or
   if BD(Aa.L,BDI).words 0–6 = 0,
      then status 1 → Aa+1 and exit.
   [To prevent a program from moving the first BD of a series of BDIs defining one logical bank, the EXEC needs to set the SIZE = 1 for all multi-BD logical banks.]
9. If BD(U.L,BDI).words 0–6 <> 0,
      then status 2 → Aa+1 and exit.
10. (BD(Aa.L,BDI)) → (BD(U.L,BDI)).
11. 0 → (BD(Aa.L,BDI)).
12. Flush the BD(Aa.L,BDI) from Base Registers and ABT.
13. Status 0 → Aa+1 and exit.

TABLE XXI

© 1996 Unisys Corporation
Unsave BD (UBD)
1. Fetch U – U+3.
   If Read or Limits error,
      then class 8 interrupt is generated and exit.
2. If U.word 0 specifies larger sizes for L, BDI, Offset or Number of words in multi-word VA than are supported by this processor,

TABLE XXI-continued then class 8 interrupt is generated and exit.
3. If (U) bits 0–2 = 7 and (U) bits 27–35 > 4,
   then fetch U+4 − U+(U)bits 27–35.
   If Read or Limits error,
     then class 8 interrupt is generated and exit.
4. If Aa.L,BDI or U.L,BDI [1-word or multi-word VA]is less than 0,32,
   then class 8 interrupt is generated and exit.
5. If Aa.L or U.L is greater than 7,
   then class 8 interrupt is generated and exit.
6. If Aa.BDI or U.BDI is not within Limits of respective BDT,
   then class 8 interrupt is generated and exit.
7. If Access Key does not provide Read access (GAP, SAP, Lock checks) to BD(U.L,BDI),
   then class 8 interrupt is generated and exit.
8. If BD(U.L,BDI).TYPE = Indirect or Peephole or
   if BD(U.L,BDI).Count <> 0 or
   if BD(U.L,BDI).Size = 1 or
   if BD(U.L,BDI).words 0–6 = 0,
     then status 2 → Aa+1 and exit.
9. If BD(Aa.L,BDI).words 0–6 <> 0,
   then status 1 → Aa+1 and exit.
10. (BD(U.L,BDI)) → (BD(Aa.L,BDI)).
11. 0 →(BD(U.L,BDI)).
12. Flush the BD(U.L,BDI) from Base Registers and ABT.
13. Status 0 → Aa+1 and exit.

A novel mechanism for flexibly expanding the virtual addressing capability of a computer system has been described herein. Computer programs requiring access to more and/or larger memory spaces than have previously been addressable in a given architecture can now do so via the Peephole/Close, Save/Unsave, and Enqueue/Dequeue instructions and the multiple word virtual address capability described herein. Backward compatibility is retained for existing code: existing programs that pass 1-word virtual addresses function without change when they are passed Peepholes. Indexing is not changed and no new execution modes are required. New data banks (with new code) can be S equals 2 data banks except for Peepholes, code Banks, and Basic Mode access. This supports future growth and permits queuing of text greater than 262K words. Enqueuing a Peephole permits a Saved BD to be Enqueued from a Level greater than 7 or a Bank Descriptor Index greater than 215 without first Unsaving the Bank Descriptor to a Level less than 7 and a Bank Descriptor Index less than 215. Dequeuing to a peephole allows a Queue Bank Descriptor to always exist at a L greater than 7 or a BDI greater than 2**15. The present invention is a very flexible addressing extension in both size of the extension and how the additional space can be manipulated.

The contemplated best mode described above best suits the 2200 Series computer system available from Unisys Corporation, which uses a "three-dimensional" (or three-level) segmented virtual address. However, the present invention also applies to "two-dimensional" (or two-level) segmented virtual addresses. In the two-dimensional case, the BDI field is deleted and the same methods described above are used. Furthermore, the present invention also is applicable to a "flat" or "one-dimensional" virtual address. In the flat address case, a unique value in the 1-word VA causes the system to look at the next word which indicates how many words of address follow. In this case, the Load Base (or possibly Load Index) Register instruction loads either the 1-word or multiple-word Virtual Address into the register. The flat address space does not support the Queuing Architecture. In a flat address system, the user saves and restores the base or index register into and from a field that is compatible with what the user believes the size of the register to be. If the register is expanded to support larger addressing, the user may still save and restore the register to/from a field that the user believes is the size of the register, as long as the saved value has leading zeroes in the area "beyond" what the field size supports. To implement peepholes, more base or index registers are required. The old program is not aware of the additional registers. The registers originally available can then peephole to the additional registers, thus giving ordinary instructions and existing programs access to the expanded virtual address space.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended Claims.

We claim:

1. In a computer system having an absolute memory address space described by an absolute address and a virtual memory address space described by a virtual address, the virtual memory address space being divided into a plurality of levels, each level including a predetermined portion of the virtual memory address space and having a plurality of banks, each bank having a plurality of words, the virtual memory addressing space having more words than are directly addressable using a single word of a predetermined fixed size defined in relationship to the word size of the computer system, a computer-implemented method of flexibly expanding the size of the virtual memory address space addressable by a program being executed by the computer system without requiring expansion of the word size of the computer system, comprising:

(a) interpreting a first predetermined number of bits within a virtual address as a pointer to a starting location within said virtual address wherein is stored a data structure having a second predetermined number of bits identifying a selected level, a third predetermined number of bits identifying a selected bank within said selected level, and a fourth predetermined number of bits identifying a selected offset word within said selected bank;
   (b) translating said selected level, said selected bank, and said selected offset word into an absolute address of a selected base location in absolute memory address space; and
   (c) providing access to selected locations in absolute memory address space relative to said selected base location.

2. In a computer system having an absolute memory address space addressed by absolute addresses and a virtual memory address space addressed by virtual addresses, the computer system having more words of virtual memory address space than are directly addressable using a single word of a fixed size defined by the word size of the computer system, the virtual memory address space being divided into a plurality of virtual memory levels, each virtual memory level being represented by a bank descriptor table having a plurality of memory bank descriptor entries, each memory bank being represented by a memory bank descriptor and having a plurality of words, a computer-implemented method of flexibly expanding the size of the virtual memory address space addressable by a program being executed by the computer system without requiring architectural changes to the computer system, the computer-implemented method comprising the steps of:

(a) defining a set of valid virtual addresses to locations within a selected area of absolute memory address space for the program;

(b) receiving a selected virtual address in said set including a first count field and a first predetermined number of bits defining a first pointer to a bank descriptor table, said first count field indicating the location within said selected virtual address of said first pointer, said selected virtual address further including a second count field and a second predetermined number of bits defining a second pointer to a memory bank descriptor stored within said bank descriptor table, said second count field indicating the location within said selected virtual address of said second pointer, said selected virtual address further including a third count field and a third predetermined number of bits defining a third pointer to a predetermined offset within a memory bank described by said memory bank descriptor, said third count field indicating the location within said selected virtual address of said third pointer;

(c) selecting a bank descriptor table in the computer system according to said first pointer;

(d) selecting a memory bank descriptor within said selected bank descriptor table according to said second pointer;

(e) selecting a predetermined offset within a memory bank described by said selected memory bank descriptor according to said third pointer;

(f) translating said selected bank descriptor table, said selected memory bank descriptor and said selected predetermined offset into an absolute address of a selected base location in absolute memory address space; and (g) providing access to the contents of selected locations in absolute memory address space relative to said selected base location.

3. The computer-implemented method of claim 2 wherein said multiple-word virtual address further includes a first predetermined plurality of words defining said first pointer, a second predetermined plurality of words defining said second pointer, and a third predetermined plurality of words defining said third pointer.

4. The computer-implemented method of claim 2, wherein step (b) includes reading said first pointer.

5. The computer-implemented method of claim 2, wherein step (c) includes reading said second pointer.

6. The computer-implemented method of claim 2, wherein step (d) includes reading said third pointer.

7. In a computer system having an absolute memory and a virtual memory, the virtual memory being divided into a plurality of virtual memory levels having a plurality of memory banks, each memory bank having a plurality of words, each virtual memory level being represented by a bank descriptor table having a plurality of memory bank descriptor entries, the virtual memory having more words than are word addressable using a single word of a fixed size defined by the word size of the computer system, a virtual addressing system for expanding the size of the virtual memory addressable by an instruction being executed by the computer system without requiring expansion of the word size of the computer system, comprising:

a virtual address data structure wherein is stored at least one word identifying a selected bank descriptor table, at least one word identifying a selected memory bank descriptor stored within said bank descriptor table, and at least one word identifying a selected offset within a memory bank described by said memory bank descriptor;

interpreting means for interpreting a first predetermined number of bits included in said virtual address data structure as a pointer to said at least one word identifying a selected bank descriptor table, said interpreting means for further interpreting a second predetermined number of bits included in said virtual address data structure as a pointer to said at least one word identifying a selected memory bank descriptor, and said interpreting means for further interpreting a third predetermined number of bits included in said virtual address data structure as a pointer to said at least one word identifying a selected offset within a memory bank described by said memory bank descriptor;

means for translating said selected bank descriptor table, said selected memory bank descriptor, and said selected offset into an absolute address of a selected base location in absolute memory; and means for providing access to selected locations in absolute memory relative to said selected base location.

8. The system of claim 7, further including means for defining a set of valid virtual address data structures to locations within a selected area of absolute memory for the program.

9. The system of claim 7, further including means for collectively interpreting said first, second, and third predetermined number of bits included in said virtual address data structure as a single-word virtual address for programs referencing single-word virtual memory addresses in the computer system.

10. The system of claim 9, further including means for allowing said programs referencing single-word virtual memory addresses to access memory banks having addresses that are larger than the largest address in the virtual address space defined by a single-word virtual address.

11. The system of claim 7, wherein the number of virtual memory levels in the computer system, the number of memory banks within the virtual memory levels, and the number of offset words within the memory banks is modified independently of each other.

12. The system of claim 7, wherein said first, second, and third predetermined number of bits included in said virtual address data structure collectively include up to a predetermined maximum number of address bits.

13. The system of claim 7, wherein the size of the field comprising said first, second, and third predetermined number of bits is modified in increments of a fourth predetermined number of bits.

14. In a computer system having a virtual memory, the virtual memory being divided into a plurality of virtual memory levels, each virtual memory level having a plurality of memory banks and being represented by a bank descriptor table, each memory bank having a plurality of words and being represented by a bank descriptor entry in a bank descriptor table, the virtual memory having more words than are word addressable using a single word of a fixed size defined by the word size of the computer system, a machine-readable data structure being a multiple-word virtual address object referenced by instructions executed by the computer system comprising:

a header structure describing the multiple-word virtual address object including a first field defining a first number of words for identifying a selected bank descriptor table, a second field defining a second number of words for identifying a selected memory bank descriptor within said selected bank descriptor table, and a third field defining a third number of words for identifying a selected offset word within a memory bank specified by said selected memory bank descriptor;

a first structure including said words for identifying said selected bank descriptor table;

a second structure including said words for identifying said selected bank descriptor within said selected bank descriptor table; and a third word structure including said selected offset word within said memory bank specified by said selected memory bank descriptor.

15. The multiple-word virtual address object of claim 14, wherein said header structure further includes a fourth field identifying a total number of words of said multiple-word virtual address object.

16. A machine-readable program storage device encoding a program comprising machine-readable instructions, which, when executed on the computer system, result in creating said multiple-word virtual address object as specified in claim 14.

* * * * *